(12) United States Patent
Nishiga et al.

(10) Patent No.: US 7,272,357 B2
(45) Date of Patent: Sep. 18, 2007

(54) INTER-VEHICLE COMMUNICATION APPARATUS AND METHOD WITH RESTRICTIONS ON SIZE OF NETWORK

(75) Inventors: Kazuya Nishiga, Iwaki (JP); Koichi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 579 days.

(21) Appl. No.: 10/768,989

(22) Filed: Jan. 30, 2004

(65) Prior Publication Data
US 2005/0003844 A1 Jan. 6, 2005

(30) Foreign Application Priority Data
Feb. 3, 2003 (JP) ............................. 2003-026547

(51) Int. Cl.
*H04B 7/15* (2006.01)
(52) U.S. Cl. .................. 455/11.1; 455/517; 455/575.9; 455/345; 455/41.2; 455/456.1; 370/338
(58) Field of Classification Search ............... 455/11.1, 455/517–519, 575.9, 90.1–90.3, 345, 41.2, 455/3, 456.1; 370/335, 338, 342, 401
See application file for complete search history.

(56) References Cited
U.S. PATENT DOCUMENTS
4,823,373 A 4/1989 Takahashi et al. ........ 455/550.1

6,204,844 B1* 3/2001 Fumarolo et al. ............ 715/736
2004/0192331 A1* 9/2004 Gorday et al. ........... 455/456.1

* cited by examiner

Primary Examiner—Philip J. Sobutka
(74) Attorney, Agent, or Firm—Brinks Hofer Gilson & Lione

(57) ABSTRACT

When a network is formed among vehicles with the use of inter-vehicle communication units, a network-forming-request-source vehicle sends its position serving as a reference position, its moving direction, and requested information to surrounding vehicles by the use of a free ID. Among the surrounding vehicles, vehicles which are to subscribe to the network receive the position, the moving direction, and the requested information, determine where the vehicles are positioned among positions specified in advance relative to the reference position, and respond at a timing corresponding to their positions by the use of free IDs. The network-forming-request-source vehicle receives the responses, stops receiving responses when the number of responded vehicles reaches an appropriate number of vehicles, and sends its genuine ID and a vehicle communication order. Then, a restriction, such as a restriction based on the number of times relay processes are allowed, a restriction based on a predetermined-distance area from the center of balance or the center, or a restriction based on a communication period equal to a predetermined time or shorter from when the network is formed, all of which correspond to the type of network, is applied to form an appropriate-area network.

20 Claims, 15 Drawing Sheets

INTER-VEHICLE COMMUNICATION APPARATUS AND METHOD WITH RESTRICTIONS ON SIZE OF NETWORK

BACKGROUND OF THE INVENTION

1. Field of the Invention

The present invention relates to inter-vehicle communication apparatuses capable of restricting an inter-vehicle network through which information is exchanged and used among vehicles, with the use of a communication unit mounted on each vehicle, so as not to extend very wide.

2. Description of the Related Art

In recent years, navigation apparatuses have been widely mounted in vehicles, and the navigation apparatuses have been provided with various useful functions. In addition to providing guidance to a destination in the conventional manner, the navigation apparatuses can display information of surrounding facilities, and information of traffic congestion on roads with the use of VICS, and can also automatically provide a detour if a traffic jam occurs on a road.

Since portable telephones have been widely used, various types of information can be obtained in vehicles from the outside. Especially, navigation apparatuses can display necessary data on their screens when they are connected to portable telephones to directly communicate with an information center, or to connect to the Internet to connect to the information center, or to various information-providing sections to receive and use the necessary data.

Further, with the development of communication technologies, communication can be performed between units to exchange data at a frequency band which can be used without a special permission, such as a communication band having a frequency of 2.4 GHz to 2.5 GHz. This is attractive as a means for exchanging data without connecting units by a cable.

When a navigation apparatus is provided with such a communication function, various units mounted in the vehicle, such as a portable telephone, and a program set in advance can be automatically used for communication in a desired manner. In this case, the navigation apparatus can display various types of information sent from the various units on the screen.

When units which can perform communication by the use of a frequency band which can be used without any permission are used in vehicles, communication can be achieved between the units in the vehicles in the same manner as when communication is achieved between a portable telephone and a navigation apparatus. In addition, if an inter-vehicle communication unit is further provided, mutual communication is allowed between the vehicle and another vehicle having a compatible inter-vehicle communication unit and located in the vicinity of the vehicle.

With the use of a program set in advance, mutual communication can be performed automatically under a predetermined condition. When a communication frequency band such as that described above is used, a vehicle having an inter-vehicle communication unit can comminute with other vehicles within a range of about 100 meters from the vehicle in a desired manner free of charge according to a use rule in the frequency band. In this case, depending on program settings, the vehicle can automatically receive predetermined information under a predetermined condition from a vehicle located in the vicinity of the vehicle and having a similar inter-vehicle communication unit, use it, if necessary, and automatically send it to other vehicles.

When such an inter-vehicle automatic communication system is used, a moving vehicle A1 can communicate with other vehicles in a range of about 100 meters from the moving vehicle to collect or exchange various types of information and data, as shown, for example, by an "inter-vehicle communication local network" in FIG. 14. In addition, when a camera is mounted in the vehicle and the camera continuously captures images ahead of the vehicle, other vehicles can take and use the images, if necessary. The inter-vehicle communication network can be used in various ways.

Since the specification of such an inter-vehicle communication local network has not been determined, it can be used in various ways. When a user having the inter-vehicle communication unit wants to subscribe to the network, for example, it is assumed in one case that the user starts operating the inter-vehicle communication unit to prepare for sending the position and the moving direction of the vehicle, the inter-vehicle communication ID, and other information, and, when the network connection is established, enters a basic-information network for exchanging basic information.

Various other optional networks can be prepared in advance, such as a same-driving-path network which includes vehicles moving along the same driving path in the same direction as the local vehicle and vehicles which seem to directly relate to the movement of the local vehicle, and further, a traffic-jam-information network for providing information used in various situations when a traffic jam occurs in the same driving path. In the traffic-jam information network, detour information useful in avoiding the traffic jam can be exchanged. The traffic-jam information network may be one of multiple optional sub-networks in the same-driving-path network, or may be formed as an independent optional network.

When the user wants to subscribe to such an optional network, the user performs an input for network subscription. When the local vehicle has a navigation apparatus and is moving toward the destination, the inter-vehicle communication unit searches for vehicles which have operating inter-vehicle communication units in a range where communications are possible, and which move in the same driving path in the same direction as the local vehicle, or are likely to come to the same driving path, and displays them on a screen. Alternatively, the local vehicle automatically sends and receives necessary information to and from the vehicles.

Further various optional networks can be considered, such as a vehicle-group network which includes vehicles having their vehicle IDs registered in advance, and a surrounding-vehicle network which includes all vehicles located around an intersection and which can be used for all vehicles to pass through the intersection safely. These networks are prepared in advance, and if necessary, such networks can be formed in a desired manner. Since other vehicles also form networks, the user can perform settings according to a setting guidance displayed on the screen before movement or during movement to determine a network to which the vehicle is to subscribe. Therefore, vehicles automatically form optional networks at a predetermined timing.

When the user wants to subscribe to a particular network, the user performs an input for network subscription. As for information specified in advance so as to be used in the network, the information of the user's vehicle is open to all network users, and the user can use the information of the other vehicles in the network in a desired way.

As shown in FIG. 14, a vehicle A4 is in a first-order inter-vehicle communication local network (A1) for the local vehicle A1, the network (A1) existing in a predetermined-distance range where communications are possible around the local vehicle A1, and the local vehicle A1 is in an inter-vehicle communication local network (A4) for the vehicle A4 where the vehicle A4 can perform communications. Therefore, the local vehicle A1 and the vehicle A4 can communicate with each other. Further, the vehicle A4 is in an inter-vehicle communication local network (A6) for a vehicle A6, and the vehicle A6 is in the inter-vehicle communication local network (A4), which is a second-order local network for the local vehicle. Therefore, the vehicle A4 and the vehicle A6 can communicate with each other.

Furthermore, in FIG. 14, through an inter-vehicle communication local network (A6) for the vehicle A6, the vehicle A6 can communicate with a dealer D3 having the same communication unit as the inter-vehicle communication unit. The inter-vehicle communication local network (A6) is a third-order local network for the local vehicle. The dealer 3 forms an independent information transfer system together with dealers D1 and D2 which are in the same group as the dealer 3, and the independent information transfer system includes an information center. Therefore, the vehicle A6 can take various types of information from the information center, and can also use a statistical data base in the information center to obtain a correctly guided path based on the latest traffic information.

With this, the vehicle A4, which is connected to the vehicle A6 through the inter-vehicle communication local networks (A6 and A4), can use the information and data which the vehicle has received from the information center. In addition, the local vehicle A1, which is connected to the vehicle A4 through the inter-vehicle communication local networks (A4 and A1), can use the information and data which the vehicle has received from the information center by the information transfer system, through the vehicle A4, which forms the second-order local network for the local vehicle. By the information transfer system, the local vehicle A1 can directly access the information center to obtain information.

In the case shown in FIG. 14, the information center is connected to the World Wide Web (WWW) on the Internet, and can obtain information through the Internet, if necessary. The Internet users can use the information of the information center. The Internet can be used in vehicles through a portable telephone carried therein, and received information can be displayed on a screen. Therefore, the information of the information center can also be obtained through the Internet.

The local vehicle can obtain various types of information through various networks, and in addition, can automatically obtain information which each vehicle possesses and allows to be made open to the public, by searching. For example, the local vehicle can obtain detailed map data which includes narrow roads, possessed by a particular vehicle to use for route calculations. The local vehicle can also use facility information and resort information collected independently, in the same way as various web sites on the Internet.

As described above, with the use of an inter-vehicle communication unit mounted in each vehicle, the inter-vehicle communication local network of the local vehicle can be connected through the inter-vehicle communication local network of another vehicle which is in the inter-vehicle communication local network of the local vehicle, to still another inter-vehicle communication local network. If a vehicle therein can obtain information from an independent information transfer system, for example, the local vehicle can also use the information.

Further, when one of the networks has an information center therein, the local vehicle can use information and data thereof. When any of the networks can be connected to the Internet, the local vehicle can obtain information on the Internet. Inter-vehicle communication networks form a very broad network in this way, and it is expected that the inter-vehicle communication networks will be further developed and used in various manners, including mutual use of images captured by cameras mounted to vehicles.

When inter-vehicle communication networks such as those described above are used, for example, to form the same-driving-path network among vehicles moving along the same path in the same direction, or to form a traffic-jam network through which predetermined information is mutually transmitted and received when a traffic jam occurs, or when a traffic-jam network serving as a single network is used, the network is formed in a way shown in FIG. 15.

In the case shown in FIG. 15, the local vehicle L3 is moving along a guided path indicated by a driving path G. When the local vehicle L3 indicated by the local vehicle position mark is moving along a road U1, it can form a local network (L3), indicated by a circular communication area, for the local vehicle L3 by a mounted inter-vehicle communication unit.

In the case shown in FIG. 15, the local network (L3) for the local vehicle L3 can physically include a total of seven vehicles, the local vehicle L3, a vehicle L2 moving along the same driving path G and located behind the local vehicle L3, a vehicle L4 moving along the same driving path G and located in front of the local vehicle L3, a vehicle L5 moving along the same driving path G and located beyond an intersection C2 positioned before the vehicle L4, a vehicle R3 moving along the road U1 but in the opposite direction, a vehicle S2 moving from the right in the figure to an intersection C2 along a road W1 intersecting with the road U1, along which the local vehicle L3 is moving, at the intersection C2, and a vehicle S3 moving from the left in the figure to the intersection C2 along the road W1.

When surrounding-vehicle networks are formed around the local vehicle L3, the local vehicle L3 can communicate with vehicles which cannot be seen from the local vehicle L3, and can obtain, for example, camera images therefrom. A person who is likely to suddenly rush out in front of the local vehicle L3 from a place which cannot be seen from the local vehicle because of a building can be observed from the camera images of those vehicles, and some measure can be taken in advance. A plurality of camera images taken at the intersection immediately before the local vehicle can be displayed on a screen in parallel to allow the driver to see the images captured from all directions at the intersection. Therefore, the driver and other passengers can travel in the local vehicle with relief even at intersections where accidents occur frequently.

In the case shown in FIG. 15, the vehicle L4 moving in front of the local vehicle L3 is not provided with an inter-vehicle communication unit used for forming an inter-vehicle network, or it is not using the communication unit (by turning it off, for example) even if the unit is provided. Therefore, this vehicle is not included in any network. Vehicles moving in the direction opposite to the direction in which the local vehicle L3 is moving are not shown in FIG. 15 so as not to make the figure more complicated. For example, one of such vehicles, the vehicle R3, can be included in the inter-vehicle communication network of the local vehicle L3. When it is determined that information sent from the vehicle R3 is rarely used, the vehicle R3 can be set in advance as a vehicle excluded from the network in the same-driving-path network or the traffic-jam network of the local vehicle L3 to automatically exclude the vehicle R3. The vehicle R3 can be included in a drive network for exchanging surrounding-facility information among vehicles surrounding the local vehicle L3.

The local network (L3) of the local vehicle L3 is connected to the local network (L5) of the vehicle L5 moving in front of the local vehicle L3 in the same driving path G. Since the local vehicle L3 is within the local network (L5) of the vehicle L5, the local vehicle L3 and the vehicle L5 can transmit and receive information and data to and from each other. In the local network (L5) of the vehicle L5, a vehicle L7 moving in front of a vehicle L6 which is moving in front of the vehicle L5 has a local network (L7). The vehicles L5 and L7 can transmit and receive information and data to and from each other in the same way.

A vehicle L8 moving in front of the vehicle L7 in the same road past an intersection C3, a vehicle L9 located on a bridge B1 in front of the vehicle L8, and a vehicle L10 moving in front of the vehicle L9 but not reaching an intersection C4 are moving and form respective local networks, and can transmit and receive information and data to and from each other. With this, the local vehicle L3 can obtain the information from the vehicle L10 through the local networks L10, L9, L7, and L3. Therefore, when the local vehicle is going to pass through a certain intersection but does not have detailed map data thereof, the local vehicle can send a request for the map data, search vehicles connected through local networks for a vehicle having the map data, and use it.

When the vehicle L10 has a camera, for example, the local vehicle L3 can obtain images taken by the camera. This means that the congestion or traffic-jam condition of a road can be actually seen on a screen by the use of a camera provided on a vehicle moving far ahead of the local vehicle. Since similar local networks are also formed to the rear of the local vehicle, similar information and the information of the local vehicle can be automatically transferred to vehicles connected to the networks and moving to the rear of the local vehicle. With the use of such camera images, a real bird's eye view can be implemented, in which far-away scenery can be seen. Further, fixed-point observation is also possible in a way in which a specific intersection such as an intersection where the local vehicle is going to turn right is selected, vehicles moving near the intersection are automatically selected, and the camera images of the vehicles are sequentially switched to always display camera images related to the intersection.

When the local vehicle is going to pass through an intersection C2 where a traffic signal is not provided, for example, a vehicle S2 moving from the right in the figure to the intersection and having a local network (S2) can be checked on the screen of the local vehicle by a vehicle mark or other icon, so that the driver can drive through the intersection at a low speed while paying attention. In this way, the state of a vehicle located at a place which cannot be seen can be understood in advance to avoid any dangerous situations during driving.

Such information transfer is possible between four or more wheeled vehicles. In addition, it is also possible between two-wheeled vehicles. When communication units are made compact, pedestrians can carry them. Then, the driver can see a person who may rush out in front of the local vehicle from a place which is out of view, on the screen, to drive the local vehicle safely while paying attention to the person. When pedestrians have such portable communication units for forming local networks, various types of information can be used by using local networks between vehicles such as those described above. Then, in addition to the local networks between vehicles, local networks can be also formed between carried mobile units to allow similar information to be transferred.

When a vehicle S3 is going to turn left at the intersection C2 where a traffic signal is not provided along the road U1 which is now congested, for example, it is possible for the driver of the vehicle S3 to perform actual conversation with the driver of the local vehicle or to send a predetermined signal to the driver of the local vehicle to exchange a request for waiting for a moment from the driver of the vehicle S3 and an affirmative response from the driver of the local vehicle, so that the vehicle S3 can turn left immediately. If the local vehicle were the vehicle S3, the driver of the local vehicle can communicate with the drivers of other vehicles moving along the congested road, so that the local vehicle can turn left smoothly at the intersection having no traffic signal. In the same way, a vehicle can smoothly go into a congested expressway from another road by performing the same communication.

Furthermore, by using the statistical data of information such as that shown in FIG. 14 through the information collection function of another vehicle which can be connected to a local network which includes the information center, various types of information can be obtained, such as specific-road traffic-jam information for certain weather or season, traffic-restriction information when it is snowing, traffic-restriction information when events such as a festival are held, and information of byroads which can be used in a traffic jam or congestion and which are known only to local people. Safe driving is made possible without any wasted time. As for byroads known only to local people, when the driving-path track data of each vehicle is obtained in the same-driving-path network, if a local person uses a byroad in the network, the data of the byroad can be automatically searched for and obtained to share the data.

Japanese Unexamined Patent Application Publication No. 2001-273593 discloses a technology in which communications are performed between an emergency vehicle and general vehicles through a base station to report to the general vehicles that the emergency vehicle is approaching. Japanese Unexamined Patent Application Publication No. Hei-9-7096 discloses a technology in which an emergency vehicle sends a radio signal having a predetermined frequency and general vehicles receive the signal to know that the emergency vehicle is approaching. Japanese Unexamined Patent Application Publications No. Hei-10-153436, No. Hei-10-311730, and No. 2000-20889 disclose technologies in which traffic information is received from the outside.

In an inter-vehicle information network system such as that described above, when a car accident occurs ahead of the local vehicle on the road on which the local vehicle is current moving and the road is blocked, the accident information can be sequentially transmitted from the vehicle which caused the accident or a vehicle which was moving thereafter to the following vehicles.

When such an accident occurs, conventionally, the accident information is collected at a traffic information center, the information is confirmed, and then it is distributed through VICS or broadcasting to an area related to the accident. Therefore, the information is transferred to vehicles moving after the car which caused the accident, but not until some time elapses after the accident occurred.

In contrast, in an inter-vehicle information network system such as that described above, the accident information is transmitted immediately to the following vehicles which will be most affected by the accident.

Even when it is found that the road is blocked by a car accident or other problem, a correct detour to avoid the accident cannot be obtained immediately in vehicles provided with navigation apparatuses using older data, or vehicles provided with navigation apparatuses having a very low calculation speed. Not all vehicles have highly functional navigation apparatuses, which can immediately provide a correct detour for driving. There are many drivers who want to use detour data provided by highly functional navigation apparatuses. Since local people frequently have detailed or special local road information, detours which the local people select are appropriate in many cases. Therefore, it is preferred that the data of such detours be obtained.

When a road is blocked by a car accident, even if detour information is transferred from a vehicle having a highly functional navigation apparatus, the detour is not necessarily appropriate for all following vehicles. The detour is most appropriate for that vehicle, but there may be another appropriate detour for the following vehicles.

In the case shown in FIG. 15, when a vehicle L9 causes a car accident on the bridge B1 to block the bridge B1, a vehicle L7 can search for a detour in which the vehicle L7 turns right at an intersection C3 to move on a road W2, turns left at an intersection C11, passes through a bridge B3, turns left at an intersection C12 to move on a road W3, and turns right at an intersection C4 to return to the driving path G, along which the vehicle L7 was to move. Therefore, when this information is sent to the following vehicle L5, the vehicle L5 can take this appropriate detour based on the information.

The detour information can be sent to and used by the further following local vehicle L3 and the following vehicle L2. In this case, however, the local vehicle L3 can search, by its navigation apparatus, for a detour in which the local vehicle L3 turns left at the intersection C2 to move on the road W1, turns right at an intersection C6, passes through an intersection C7 and a bridge B2, turns right at an intersection C8 to move on a road W3, and turns left at the intersection C4 to return to the driving path G, along which the local vehicle L3 was to move. This detour is shorter than the detour which the vehicle L7 searched for, and hence more appropriate for the local vehicle L3. The following vehicle L2 can use this detour information of the local vehicle L3.

In the same way, a vehicle L1 can use the above-described two pieces of detour information, but can search for a more appropriate detour in which the vehicle L1 turns left at an intersection C1, turns right at an intersection C5, and moves through the detour which the local vehicle L3 found, to immediately avoid the road where the traffic jam occurred. Therefore, the vehicle L1 can immediately move through the detour. This information can be transferred to all vehicles connected through the local networks, but it is meaningless for the vehicle L7, and it is not useful for the local vehicle L3 because it is not appropriate in many cases for the local vehicle L3 to make a U-turn to go back to the intersection C1, and turn right to take the detour which the vehicle L1 found.

In this way, even when local networks can be connected to form a wide network, a network having a restricted area may be preferable depending on the information to be obtained. It is preferred in many cases that the size of a network be restricted for shopping information at nearby stores and neighborhood-event information, in addition to detour information used in the event of a car accident or traffic jam.

To restrict the size of a network, coordinates or road links can, for example, be used, but are not preferable for networks in which network components, such as vehicles, move to change the locations of the networks, because a huge amount of calculation is required.

In addition to an area restriction, such as that applied to an area around the local vehicle, a time restriction, such as that used when the information of events to be held by ten o'clock in the morning of that day is obtained, may be required for a specific network. In such a case, coordinates or road links cannot be used for restriction.

When the user wants to know a detour around a car accident or traffic jam, or when the user wants to form a detour-information network with vehicles surrounding the local vehicle, if the user requests the surrounding vehicles to exchange IDs for forming the network, the surrounding vehicles may respond at a similar time. If there are many surrounding vehicles, the responses therefrom may cause interference, which disables correct receiving and hence disables forming a network. If PN code and IDs are known in advance, a transmission sequence can be determined in advance to avoid the interference. If PN code and IDs are not known, an appropriate action cannot be taken.

After a network forming request is sent to surrounding vehicles, when it is found that there are many vehicles which can respond to the request in the area of the first-order local network in which direct communications with the local vehicle is possible, if forming a network with too many vehicles is not a good idea, the number of vehicles to be included in the first-order local network may be restricted. To this end, means for reducing the number of vehicles which respond at a time to an appropriate number is necessary.

Information exchanges are impossible if PN code and IDs are not known to each other in forming a network. It is not preferred that the PN code and ID of the local vehicle be sent to all surrounding vehicles. Especially when the number of vehicles is to be restricted in the area where direct communications with the local vehicle is possible, it is not necessary to inform all surrounding vehicles of the PN code and ID of the local vehicle. Means for handling this issue is required.

SUMMARY OF THE INVENTION

Accordingly, it is an object of the present invention to provide an inter-vehicle communication apparatus which can easily apply an appropriate restriction to a network formed between vehicles by the use of inter-vehicle communication units for information exchanges, which does not cause interference when the network is formed, and which can prevent PN code and IDs from being conveyed superfluously.

The foregoing object is achieved in one aspect of the present invention through the provision of an inter-vehicle communication apparatus, including an inter-vehicle communication unit, a network-forming processing section for forming a network with surrounding vehicles, and an information-exchange processing section for performing information-exchange processing between network-forming vehicles, wherein the network-forming processing section includes a network-forming restriction section for restricting a network-forming area. When a network is formed among vehicles by the use of inter-vehicle communication units for information exchanges, various network-forming restriction sections can apply appropriate restrictions, which prevents an information-requesting vehicle from receiving meaningless information generated in a too-wide network.

The network-forming restriction section may be a first-order-network restriction section for restricting the forming of a first-order network in which the inter-vehicle communication unit directly performs communications. Vehicles positioned in an area where the inter-vehicle communication unit can communicate can be restricted to an appropriate number of vehicles for communication, which especially prevents interference caused when the network is formed.

The inter-vehicle communication apparatus may be configured such that the first-order-network restriction section sends at least a signal indicating the position of the vehicle to which the inter-vehicle communication apparatus is mounted, the position serving as a reference position, and a network-forming-request signal to surrounding vehicles by the use of a tentative PN code known to other vehicles, and surrounding vehicles which receive both of the signals sequentially communicate with a network-forming-request-source vehicle at a timing specified in advance according to the positions of the surrounding vehicles relative to the reference position. In this case, the PN code is prevented from being superfluously made open to the public, and a network-forming signal can be transmitted and received easily, always preventing interference.

The first-order-network restriction section may count the number of vehicles by signals sequentially sent from the surrounding vehicles to the network-forming-request-source vehicle and stop receiving when the number of vehicles is equal to or larger than a predetermined value to restrict the forming of the first-order network. In this case, the network-forming-request-source vehicle can always apply an appropriate restriction to vehicles which perform information exchanges in the first-order network.

The surrounding vehicles may sequentially communicate with the network-forming-request-source vehicle by the use of a free ID. Alternatively, the surrounding vehicles may exchange genuine-ID data with the network-forming-request-source vehicle after the forming of the first-order network is restricted. In either case, the genuine ID is always prevented from being superfluously made open to the public.

The network-forming restriction section may include a relay section for receiving a signal from another vehicle and for sending it to yet another vehicle. In this case, the inter-vehicle network can be extended widely. Sightseeing information or resort information, for example, can be obtained from vehicles located in a wide area, and the most appropriate information can be selected among many pieces of information.

The network-forming restriction section may restrict the number of times relay processes are performed by relay sections between when a vehicle sends information and when the network-forming-request-source vehicle receives the information. In this case, even when the network has a very wide area due to the provision of the relay section, the size of the network is always and easily restricted to a predetermined area.

The network-forming restriction section may restrict the network-forming area according to a distance from a specific position. The specific position may be the center of balance or the center obtained from the network to be formed, or the position of the vehicle to which the inter-vehicle communication apparatus is mounted. In any case, the network is always and easily restricted. Especially when desired information tends to depend on a distance, the network can be appropriately restricted.

The distance from the specific position may be set according to the number of vehicles included in the network to be formed. When the network is restricted according to the number of times relay processes are allowed, or according to a distance, the number of vehicles included in the network may become very large or very small. This is prevented when the network is restricted according to the number of vehicles included in the network.

The specific position may be a specific intersection.

The network-forming restriction section may restrict the network-forming area according to the time period which has elapsed from when information was requested. In this case, when time is important as in information of an event to be held at a specific time, receiving information which becomes meaningless because the corresponding time has passed is not performed.

The network-forming restriction section may restrict the network-forming area according to the type of information to be exchanged between network-forming vehicles. In this case, an appropriate network-forming area is specified according to the special nature of the information, such as detour information, traffic-jam information, or sightseeing-guide information.

The network-forming restriction section may include a storage section for storing in advance a restriction value. In this case, the network is appropriately restricted easily and quickly, and the user does not need to enter a restriction.

The network-forming restriction section may restrict the network-forming area by making the inter-vehicle communication unit of the vehicle to which the inter-vehicle communication unit is mounted restrict processing for receiving information sent to the vehicle. In this case, network forming is always restricted without depending on other vehicles.

The network-forming restriction section may restrict the network-forming area by making, in a relaying vehicle which receives a restriction signal from an information-requesting vehicle, the relay section not relay a signal. In this case, the vehicle to which the inter-vehicle communication apparatus is mounted does not need to perform network-forming restriction processing such as those described above, and the restriction processing is achieved in the processing of the relay section of another vehicle.

The network-forming restriction section restricts the network-forming area by making an information-transmitting vehicle which has received a restriction signal from an information-requesting vehicle not perform information-transmitting processing. The information-requesting vehicle achieves the network-forming restriction processing. Each vehicle does not need to perform relay processing, and the information-requesting vehicle reduces a processing load.

The network-forming restriction section may update vehicles positioned in a network-forming restriction area in response to vehicle movement or elapsed time. In this case, an appropriate network is always formed in response to a change in the structure of the network, caused by vehicle movement or elapsed time.

DESCRIPTION OF THE PREFERRED EMBODIMENTS

Figure 1:
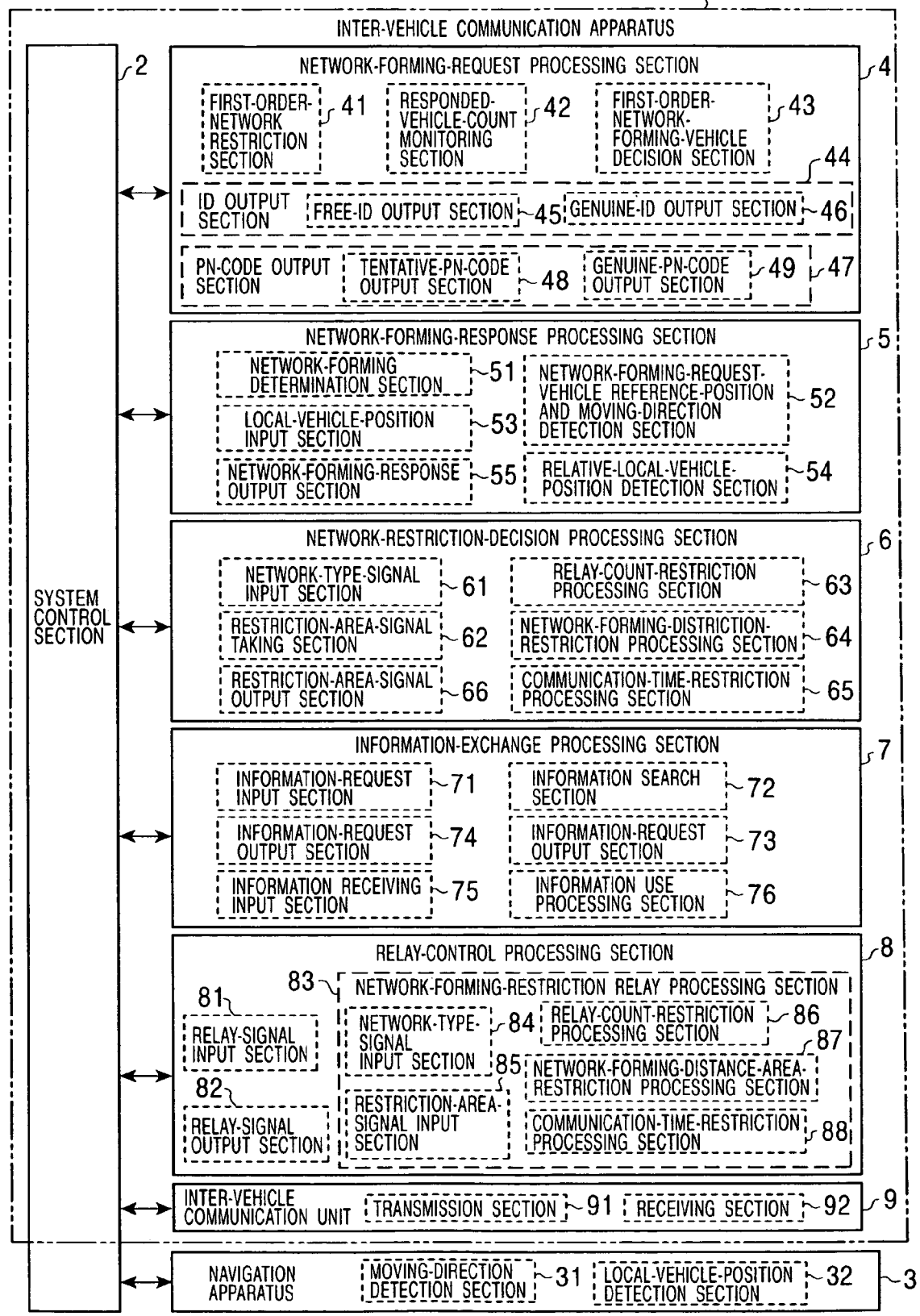
FIG. 1 is a functional block diagram of an inter-vehicle communication apparatus according to an embodiment of the present invention, showing the main functions and the relationship therebetween.

Embodiments of the present invention will be described below by referring to the drawings. FIG. 1 is a block diagram of functional sections and their arrangement used for solving the above-described problems in an inter-vehicle communication apparatus according to the present invention. The functional sections can be operated according to operation flows shown in FIG. 2 to FIG. 8. The inter-vehicle communication apparatus 1 is provided with a system control section 2 having a CPU, a ROM for storing software which includes a program for controlling each functional section of the inter-vehicle communication apparatus, a RAM for temporarily storing data, and other components as is known. The system control section 2 is connected to a navigation apparatus 3, and the signals of a moving-direction detection section 31 and a local vehicle-position detection section 32 provided for the navigation apparatus 3 can be used in the inter-vehicle communication apparatus. Each functional section shown in FIG. 1 can be called a means for performing each function.

The inter-vehicle communication apparatus 1 basically includes a network-forming-request processing section 4 for mainly performing operations when the local vehicle wants to form a network, a network-forming-response processing section 5 for performing operations in order to respond to a network-forming request sent from another vehicle, a network-forming-restriction-decision processing section 6 for restricting the network to have an appropriate area when a request for forming the network is issued, an information-exchange processing section 7 for exchanging desired information after the network is formed, a relay-control processing section 8 for relaying information sent from a vehicle included in the first-order network of the local vehicle to other vehicles included in the first-order network, or to other vehicles included in the second-order, third-order, etc., networks connected to the first-order network, and an inter-vehicle communication unit 9 for communicating with other vehicles.

The network-forming-request processing section 4 is provided with a first-order-network restriction section 41 for restricting vehicles included in the first-order network serving as a local network for direct communications with the local vehicle; a responded-vehicle-count monitoring section 42 for monitoring the number of vehicles which have responded to a network forming request sent from the local vehicle, in order to perform a restriction in the first-order-network restriction section 41; a first-order-network-forming-vehicle decision section 43 for deciding vehicles to be finally included in the first-order network; an ID output section 44 for outputting IDs required for communications; and a PN-code output section 47 for outputting a PN code required for communications.

The ID output section 44 includes a free-ID output section 45 for outputting a free ID which is determined in advance and which can be immediately recognized by other vehicles in an initial stage of network forming, and a genuine-ID output section 46 for outputting a genuine ID required for information-exchange communications with vehicles included in the first-order network after the vehicles are included in the first-order network. In the same manner as the ID output section 44, the PN-code output section 47 includes a tentative-PN-code output section 48 for outputting a tentative PN code used by other vehicles, and a genuine-PN-code output section 49 for outputting a genuine PN code used for information-exchange communications with vehicles included in the first-order network after the vehicles are included in the first-order network.

The network-forming-response processing section 5 is provided with a network-forming determination section 51 for determining when a network-forming request for specific-information exchanges is sent from another vehicle, whether the local vehicle subscribes to the network; a network-forming-request-vehicle reference-position and moving-direction detection section 52 for detecting, when the network-forming determination section 51 has determined that the local vehicle subscribes to the network, a reference position which is the position of the vehicle which has sent the network-forming request and the moving direction of the vehicle in data received from the vehicle; a local vehicle-position input section 53 for inputting the position of the local vehicle from the navigation apparatus 3; a relative-local-vehicle-position detection section 54 for detecting a relative position of the local vehicle as described later from the position and the moving direction of the network-forming-request vehicle detected by the network-forming-request-vehicle reference-position and moving-direction detection section 52; and a network-forming-response output section 55 for reporting at a timing determined in advance to the network-forming-request vehicle that the local vehicle may subscribe to the network, according to the relative position detected by the relative-local-vehicle-position detection section 54.

The network-forming-restriction-decision processing section 6 is provided with a network-type-signal input section

61 for inputting a signal which indicates the type of the requested network when forming the network is requested; a restriction-area-signal taking section 62 for receiving a signal which specifies an appropriate network restriction area according to the type of the network input by the network-type-signal input section 61 or according to the user's needs; a relay-count-restriction processing section 63 for performing processing in which a vehicle which needs the number of relay processes equal to or larger than a predetermined relay count is excluded from vehicles to be included in the network, according to the signal which indicates the restriction area received by the restriction-area-signal taking section 62; a network-forming-distance-area-restriction processing section 64 for performing processing in which vehicles located outside the area defined by a predetermined distance from a specific point such as the center of balance or the center of the network are excluded from vehicles to be included in the network; a communication-time-restriction processing section 65 for performing processing in which a vehicle which sends information when a predetermined time or more elapses after forming the network is requested is excluded from vehicles to be included in the network; and a restriction-area-signal output section 66 for outputting a restriction-area signal used by a vehicle included in the network, not the vehicle which has requested to form the network, to apply the same restriction as that applied in the network restriction processing described above by controlling a process for relaying information from another vehicle to the vehicle which has requested to form the network.

The network-forming-restriction-decision processing section 6 can apply a restriction to vehicles included in the network as described above, and in addition, can restrict not only the network itself but also received signals in processing circuits. A restriction can be substantially applied to the vehicles included in the network by a setting such that, for example, the relay-count-restriction processing section 63 stops performing the internal processing of a signal received through the number of relay processes equal to or larger than a predetermined number, the network-forming-distance-area-restriction processing section 64 stops performing the internal processing of a received signal sent from outside of the area a predetermined distance from a specific point such as the center of balance or the center of the network, or the communication-time-restriction processing section 65 stops performing the internal processing of a signal received when a predetermined time or more elapses after forming the network is requested.

The network-forming-request processing section 4, the network-forming-response processing section 5, and the network-forming-restriction-decision processing section 6 can be collectively regarded as a network-forming processing section for forming a network to communicate with other vehicles in the inter-vehicle communication apparatus.

The information-exchange processing section 7 is provided with an information-request input section 71 for inputting the signal of information which another vehicle requires, the signal being output from the other vehicle to the vehicle which formed the network after the network is formed; an information search section 72 for searching the local vehicle for the required information received from another vehicle; an required-information output section 73 for outputting information obtained as a result of search to another vehicle, which has required the information; an information-request output section 74 for outputting, when the user of the local vehicle wants to obtain information by forming a network, an information request to surrounding vehicles before forming the network is decided, or an information request after forming the network is decided; an information receiving input section 75 for receiving information sent from another vehicle in response to the information request sent by the local vehicle; and an information-use processing section 76 for performing various information-use processes, such as, when the obtained information is detour information, sending it to the navigation apparatus 3.

The relay-control processing section 8 is provided with a relay-signal input section 81 for inputting a relay signal for sending information from a vehicle included in the first-order network formed by the local vehicle to other vehicles included in the first-order network or to vehicles included in the second-order, third-order, etc., networks connected to the first-order network; a relay-signal output section 82 for relaying and outputting the relay signal to the predetermined other vehicles; and a network-forming-restriction relay processing section 83 for performing operations in the same way as the network-forming-restriction-decision processing section 6 so as not to output the relay signal to the vehicle which requested the information when a network-forming area has been restricted as described above even if the relay signal is input.

The network-forming-restriction relay processing section 83 performs almost the same processing as the network-forming-restriction-decision processing section, and includes a network-type-signal input section 84 for inputting the signal type of the requested information output from the information-request output section 74 of the vehicle which requires network forming; a restriction-area-signal input section 85 for inputting a signal related to the area to which the network is restricted, output from the restriction-area-signal output section 66 of the vehicle which requires network forming; a relay-count-restriction processing section 86 for performing restriction processing in which information for which the number of relay processes equal to or larger than a predetermined relay count is not relayed to the vehicle which required the information; a network-forming-distance-area-restriction processing section 87 for performing processing in which information sent from a vehicle located outside the area defined by a predetermined distance from a specific point such as the center of balance or the center of the network is not relayed; and a communication-time-restriction processing section 88 for performing, when a communication-time restriction is applied to the network, processing in which information is not relayed if the communication time has already elapsed.

In restriction decision processing in which a network-area restriction is decided, in addition to the above-described aspect, a restriction can be substantially applied to the network by a process performed by the information transmission side, such as a process in which information is not sent from the local vehicle to a vehicle which requested the information when the number of required relay times is equal to or larger than a predetermined number, a process in which information is not sent from the local vehicle to a vehicle which requested the information when the local vehicle is located outside the area specified by the network-forming-distance-area restriction, or a process in which information is not sent from the local vehicle to a vehicle which requested the information if a predetermined time has elapsed since the information was requested. Any of the above-described various types of network-restriction-decision processing can be performed in parallel.

The inter-vehicle communication unit 9 is provided with a transmission section 91 and a receiving section 92, and performs communications in a frequency band, e.g., of 2.4 to 2.5 GHz by using a tentative PN code which all vehicles know and free IDs in an initial stage when the network is being formed and by using a genuine PN code and genuine IDs after vehicles included in the network are determined.

Figure 2:
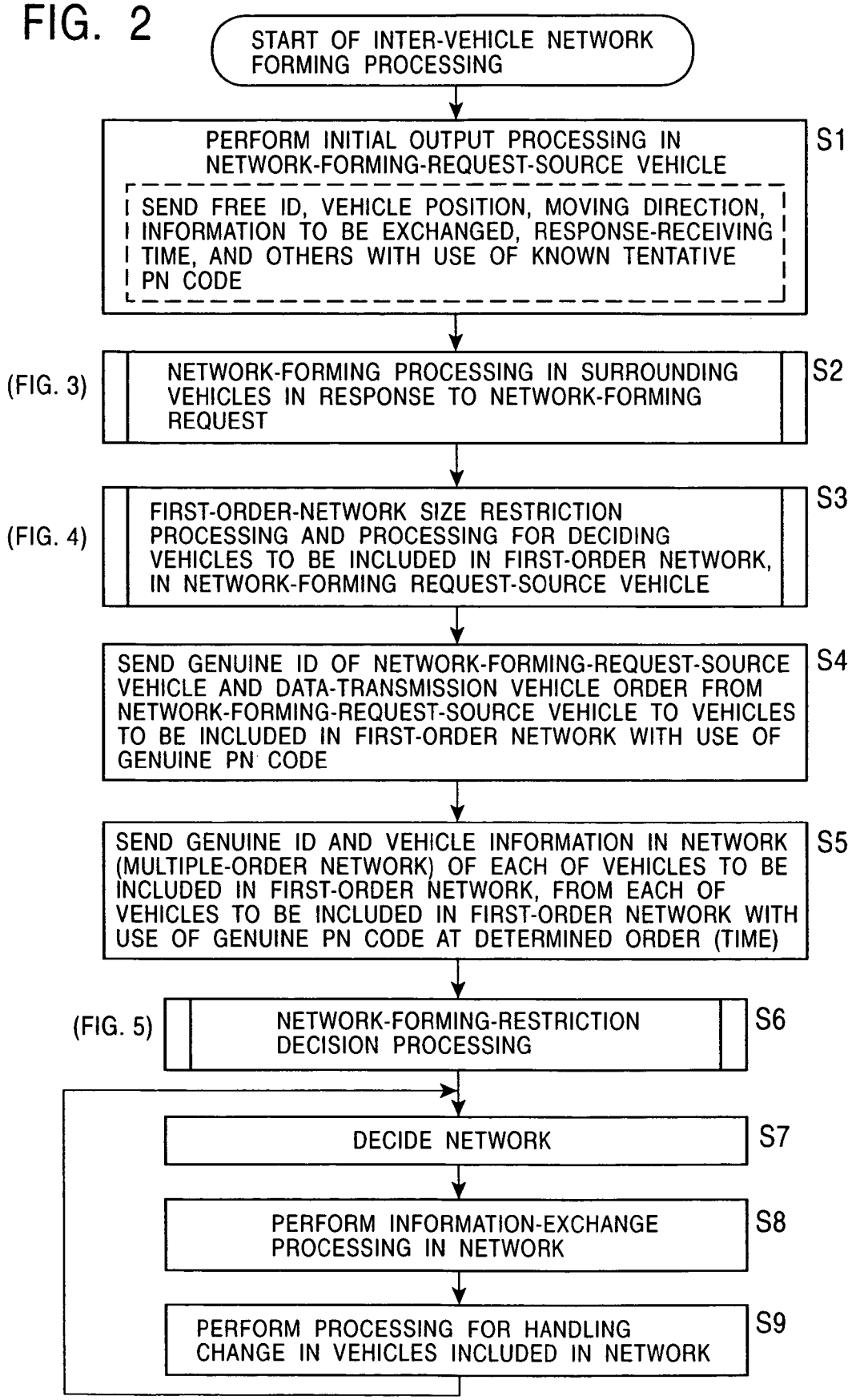
FIG. 2 is a flowchart showing the overall operation in the embodiment.

Then inter-vehicle communication apparatus 1 having the above-described functional sections performs inter-vehicle-network-forming processing according to a basic operation flow shown in FIG. 2. In the case shown in FIG. 2, in the inter-vehicle-network (NW) forming processing performed by the inter-vehicle communication apparatus, a vehicle which requests network forming performs an initial output process in step S1. As shown in FIG. 2, a free ID is used, and items, such as the position and moving direction of the local vehicle, information to be exchanged, and a response receiving time at which the mode is changed from an initial transmission mode in which the initial output is repeatedly performed within a predetermined time to a receiving mode in which signals are received from other vehicles, are sent with the use of a tentative PN code which all vehicles have already known. This operation is performed by the corresponding functional sections in the network-forming-request processing section 4 shown in FIG. 1.

Figure 3:
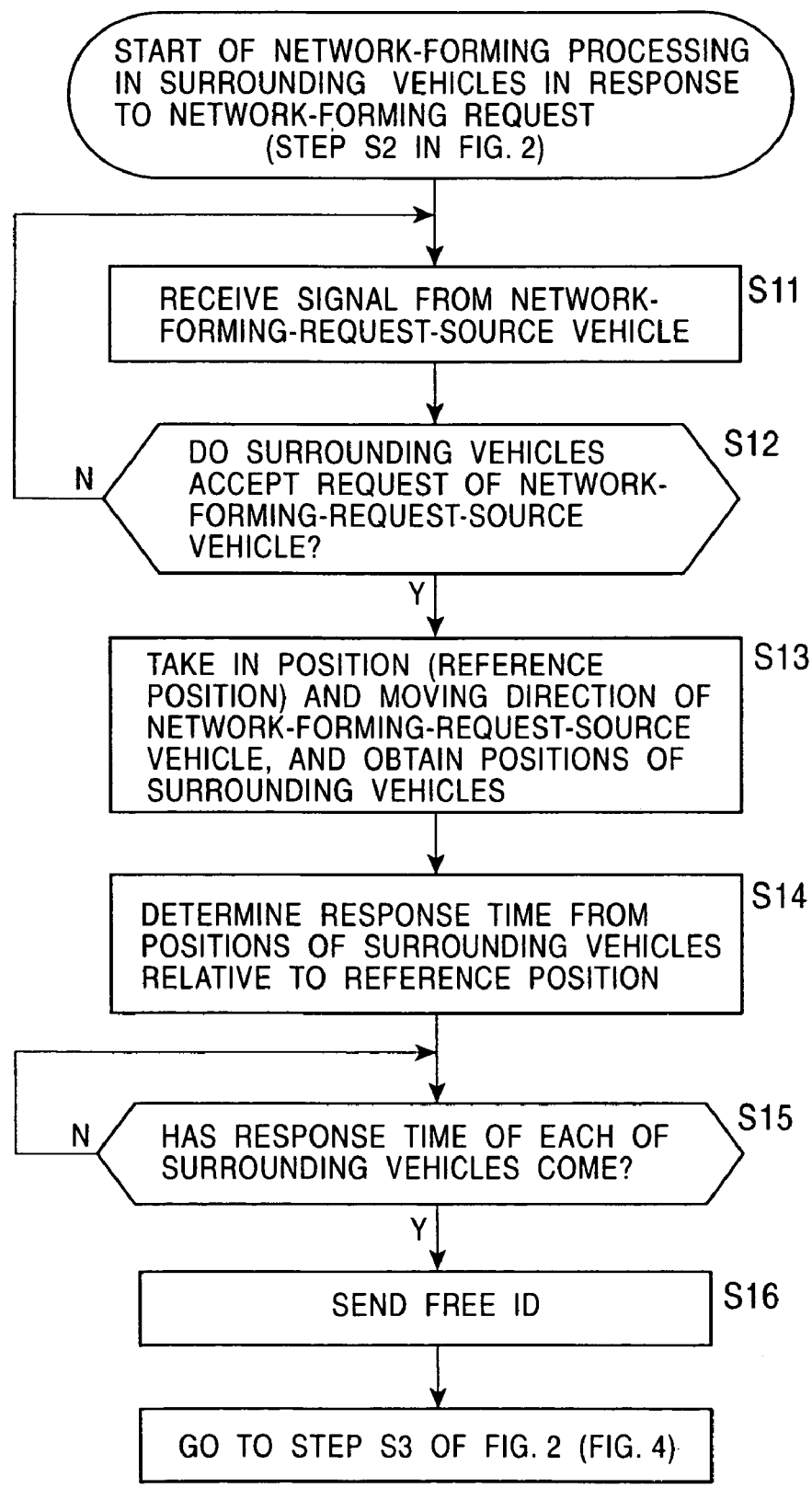
FIG. 3 is a flowchart of network-forming processing in surrounding vehicles in response to a network-forming request, which is performed in step S2 of FIG. 2.
Figure 4:
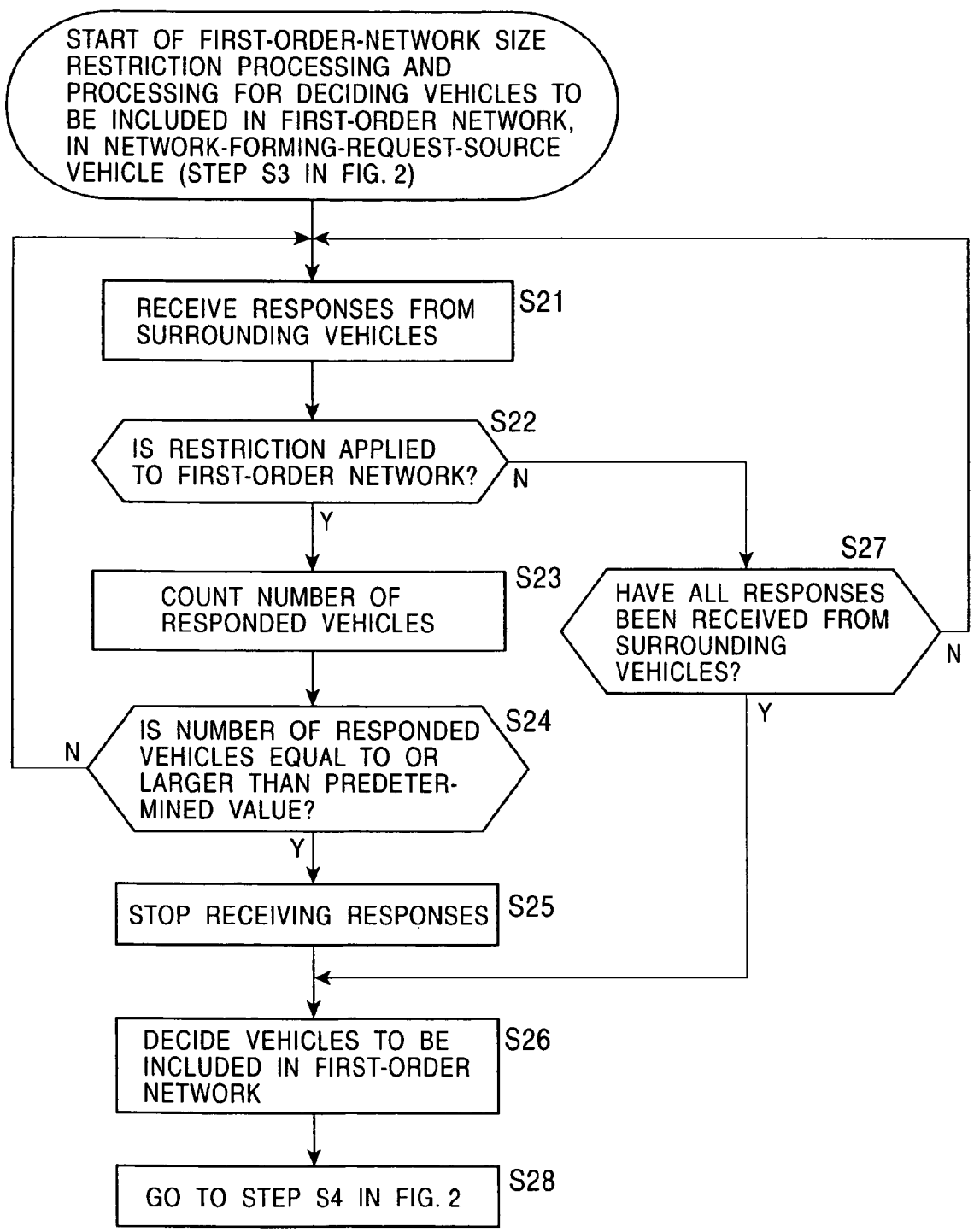
FIG. 4 is a flowchart of first-order-network size restriction processing and processing for deciding vehicles to be included in the first-order network, in the network-forming-request-source vehicle, performed in step S3 of FIG. 2.

Then, network-forming processing is performed in step S2 in vehicles surrounding the vehicle which requested network forming, in response to the network-forming request. FIG. 3 shows a more detailed operation of the network-forming processing, described later. Next, in step S3, the vehicle which requested network forming performs first-order-network size restriction processing and processing for deciding vehicles to be included in the first-order network. FIG. 4 shows a more detailed operation thereof, described later. Then, the vehicle which requested network forming sends its genuine ID and a data-transmission vehicle order to the vehicles to be included in the first-order network, which was decided as described above, by using a genuine PN code in step S4.

Figure 5:
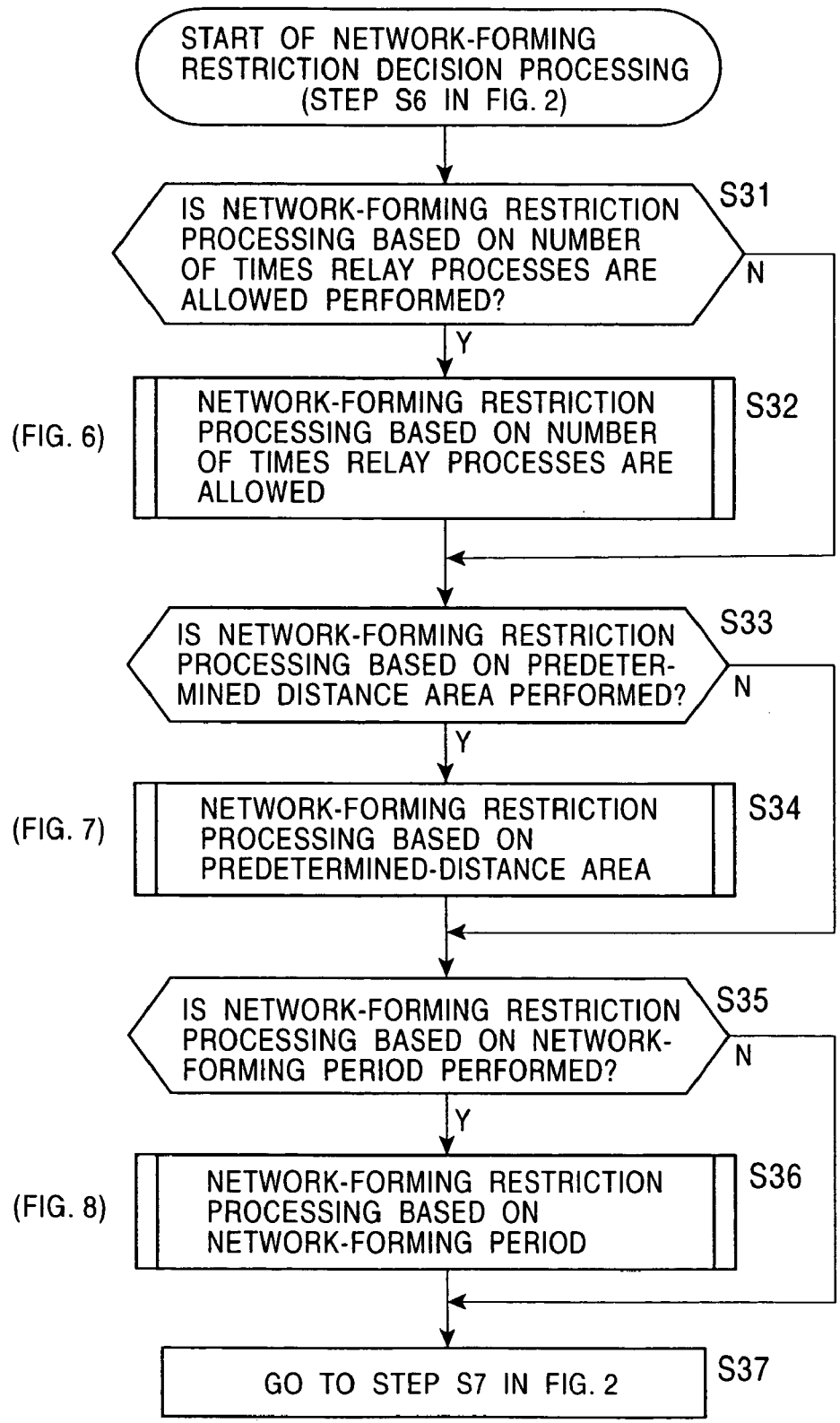
FIG. 5 is a flowchart of network-forming-restriction decision processing performed in step S6 of FIG. 2.

In step S5, the vehicles to be included in the first-order network send to the vehicle which requested network forming, in the data-transmission vehicle order, that is, at a timing corresponding to each vehicle after the transmission start time, their genuine IDs and the information of vehicles included in the networks which include the vehicles, the networks being the second-order, third-order, etc., networks (multiple-order networks) viewed from the vehicle which requested network forming, by using the genuine PN code. Then, restriction decision processing for the multiple-order networks obtained this way is performed in step S6. FIG. 5 shows the restriction decision processing in more detail, and will be described later.

The vehicles to be included in the network are finally decided in step S7, and information-exchange processing is performed between vehicles in the network in step S8. Since the local vehicle and the vehicles included in the network move and there may be a vehicle located outside the network due to the applied restriction, processing for handling a change in the vehicles included in the network is performed in step S9. Then, the inter-vehicle-network-forming processing returns to step S7 to decide vehicles to be included in the network again, and the subsequent processes are performed. The processing for handling a change in the vehicles included in the network, performed in step S9, is substantially the same as the restriction decision processing for the multiple-order networks, performed in step S6.

The network-forming processing performed in step S2 of FIG. 2 in vehicles surrounding the vehicle which requested network forming, in response to the network-forming request, can be sequentially achieved according to the operation flow shown in FIG. 3. The network-forming processing shown in FIG. 3 will be described by referring to FIG. 9 and FIG. 10. In the case shown in FIG. 3, the vehicles surrounding the vehicle which requested network forming receive a signal from the vehicle which requested network forming in step S11. The request-source vehicle sends the network-forming request repeatedly during a period from t1 to t2 shown in FIG. 9(a), and the surrounding vehicles receive the signal.

Then, the surrounding vehicles determine in step S12 whether they accept the network-forming request sent from the request-source vehicle. The surrounding vehicles examine the information to be exchanged, sent from the vehicle which requested network forming, and determine whether the information is related to the vehicles or whether they may provide the information. When they determine that they do not accept the request, the processing returns to step S11, and the processes are repeated until an information-exchange request for which forming a network is desirable is received from another vehicle.

Figure 10:
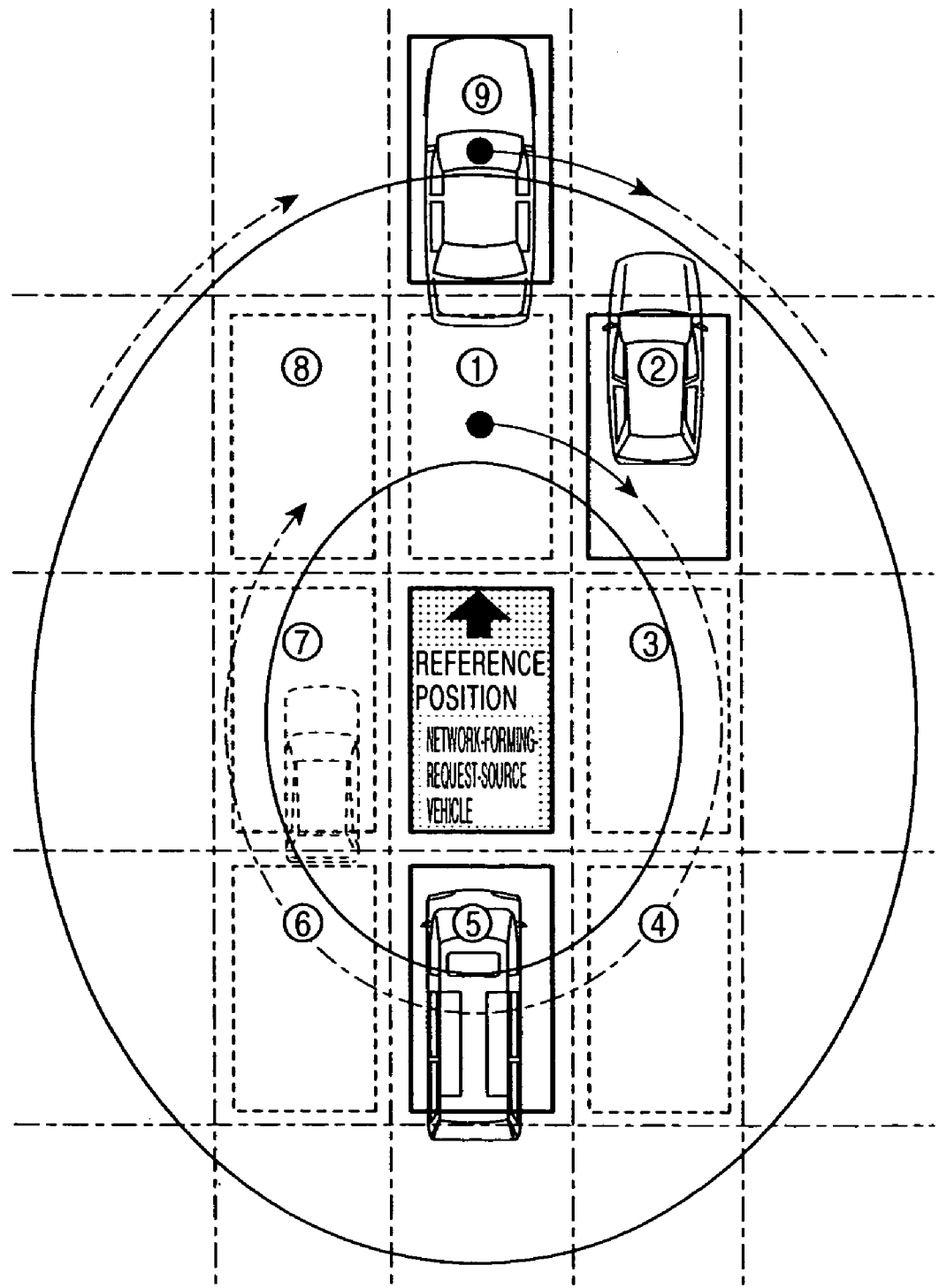
FIG. 10 illustrates an example order assignment to vehicles around a network-forming-request-source vehicle in the first-order-network-size restriction processing.

When the surrounding vehicles determine in step S12 that they accept the request of the vehicle which requested network forming, they receive the current position of the request-source vehicle, which is the reference position, and its moving direction, sent from the request-source vehicle, and calculate the relative positions of the surrounding vehicles in step S13. In this calculation, as shown in FIG. 10, for example, rectangular cells having almost the same width and length as usual vehicles are generated around the request-source vehicle, and the positions of the surrounding vehicles are found. Numbers are assigned in advance to the rectangular cells such that number

is assigned to the rectangular cell positioned immediately in front of the request-source vehicle in its moving direction, numbers

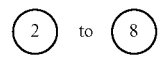

are assigned to rectangular cells clockwise starting from the rectangular cell next to the rectangular cell having number

at the right, number

is assigned to the rectangular cell positioned immediately in front of the rectangular cell having number and the other numbers are assigned in the same manner. All vehicles understand the arrangement of the rectangular cells, and the surrounding vehicles detect their positions by the numbers of the rectangular cells. In the case shown in FIG. 10, vehicles which can perform inter-vehicle communications are located at the rectangular cells ②, ⑤, ⑦, and ⑨.

Then, in step S14, the surrounding vehicle determine the response time when the vehicles send responses to the request-source vehicle, from the positions of the vehicles relative to the reference position. For example, the vehicle positioned almost at the rectangular cell

② has already understood as described above that the vehicle is positioned at the rectangular cell

②, and therefore, determines the response time specified in advance corresponding to the position according to the response-start-time signals (time signals indicating time intervals from signal reception) sent from the request-source vehicle. The vehicle positioned at the rectangular cell

② understands from the response-start-time signals that the request-source vehicle finishes sending the network-forming request at time t2, and starts receiving responses at t3. Since it is determined that a vehicle positioned at the rectangular cell

① can send a signal at time t3, and the vehicle positioned at the rectangular cell

② can send a signal at time t4, a predetermined time interval after time t3, the vehicle positioned at the rectangular cell

② knows that it can send a signal at time t4. In the same way, all the other surrounding vehicles can determine their own response times.

Each of the surrounding vehicles determines in step S15 whether its own response time has come. When the response time has not come, the process of step S15 is repeated. When the response time has come, the vehicle sends its free ID. The free ID may be determined in advance, or may be generated by a random number. It needs to be identified by the other vehicles. These processes are performed, and then the processing proceeds to step S3 of FIG. 2.

In step S3 of FIG. 2, the vehicle which requested network forming performs the first-order-network size restriction processing and the processing for deciding vehicles to be included in the first-order network. FIG. 4 shows the detailed operation thereof. In the case shown in FIG. 4, the request-source vehicle receives responses from the surrounding vehicles in step S21. FIG. 9(b) shows the response signals sent from the surrounding vehicles. They are free-ID signals sent in step S16 indicating that the corresponding surrounding vehicles accepted the network-forming request. Next, the request-source vehicle determines in step S22 whether it applies a restriction to the first-order network. More specifically, the request-source vehicle determines whether vehicles (to be included in the first-order network) which perform direct communications with the request-source vehicle are restricted to a predetermined number of vehicles. This determination can be automatically performed by request information which applies a restriction determined in advance, such as detour request information which applies the above-described restriction.

Then, the number of responding vehicles is counted in step S23. The counting is performed during a period called response receiving (counting the number of responses) in the case shown in FIG. 9. In step S24, it is determined whether the number of responding vehicles has reached a predetermined number. When the number of responding vehicles does not reach the predetermined number, the processing returns to step S21, and receiving responses from surrounding vehicles and the subsequent processes are repeated. When it is determined that the number of responding vehicles has reached the predetermined number, response receiving is stopped in step S25.

Figure 9:
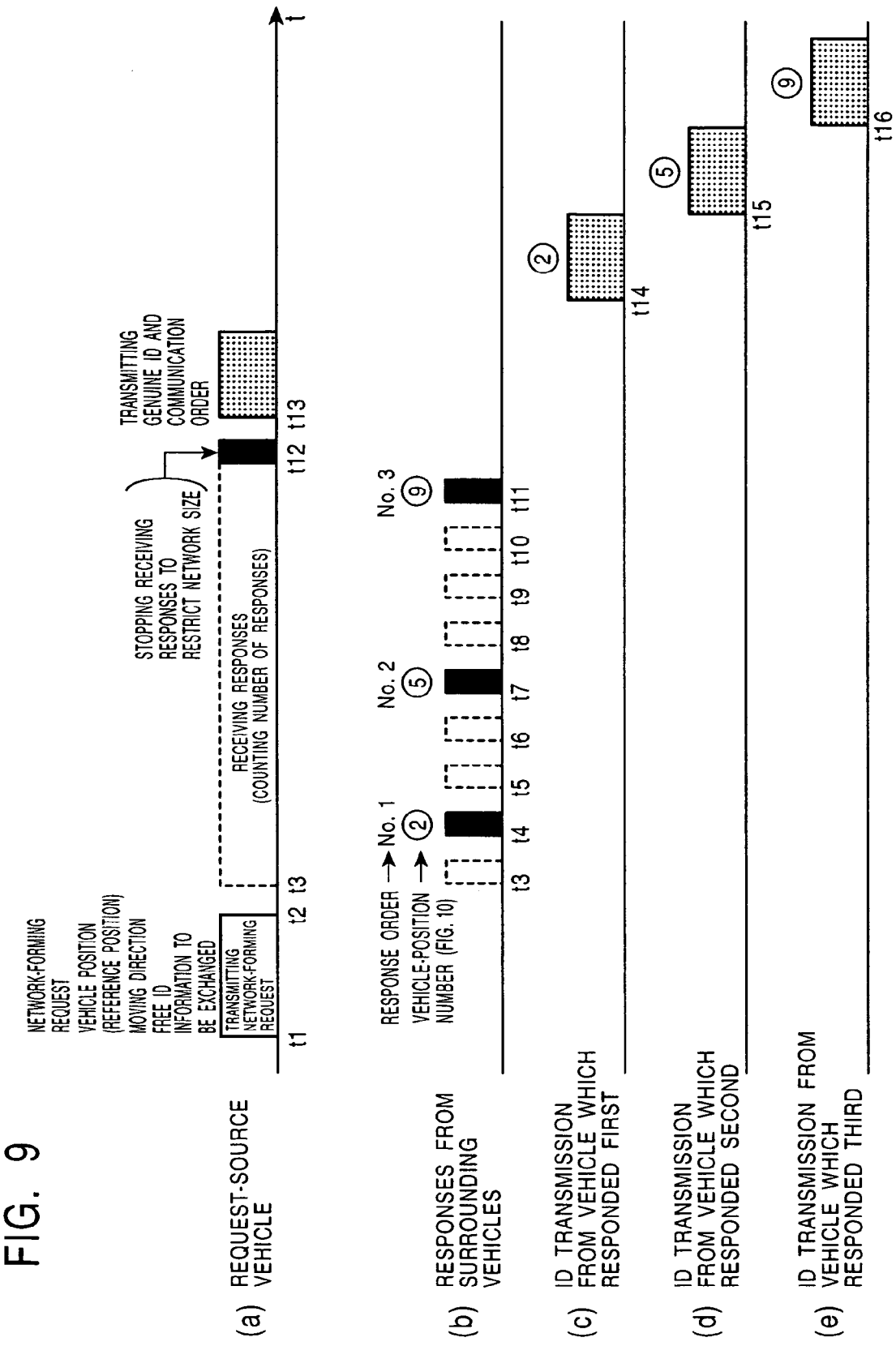
FIG. 9 is a timing chart showing operations in first-order-network-size restriction processing performed together with surrounding vehicles.

In the case shown in FIG. 9, the vehicle positioned at the rectangular cell

⑤ makes a response after the vehicle positioned at the rectangular cell

②, the vehicle positioned at the rectangular cell (7)

does not make a response because it is not included in the network, and the vehicle positioned at the rectangular cell (9)

makes a response. In the case shown in FIG. 9, it has been already determined that receiving responses is stopped when three vehicles have responded. Therefore, when the request-source vehicle receives the response from the vehicle positioned at the rectangular cell (9), it is determined that the number of responding vehicles has reached the predetermined number, and receiving responses is stopped to restrict the network size as shown in FIG. 9. Alternatively, the request-source vehicle may transmit a signal, indicating that receiving responses have been stopped, to the surrounding vehicles to prevent them from responding.

The vehicles to be included in the first-order network are decided in step S26, and the processing returns to step S4 of FIG. 2. The request-source vehicle sends its genuine ID and a data transmission request to the vehicles included in the first-order network with the use of the genuine PN code. More specifically, the request-source vehicle sends the genuine ID to the vehicles included in the network at time t13 as shown in FIG. 9(a), and the vehicles included in the network send their genuine IDs in the order specified in advance at time t14, time t15, and time t16 by the use of the genuine PN code as shown in FIG. 9(c), FIG. 9(d), and FIG. 9(e).

With the above-described operation, communications become possible between vehicles which did not know their IDs at first. In addition, genuine IDs are not superfluously made available to third parties, and are reported only to vehicles which need the genuine IDs. Since the number of vehicles included in the first-order network can be restricted, when it is preferred that information is exchanged among vehicles positioned in a limited area, such as in forming a network for a specific intersection or in forming detour-information-exchange network, vehicles to be included in the network can be restricted in advance, and when it is preferred that information is obtained in a wide area, such as surrounding-resort-facility information, the area can be extended. Even when genuine IDs have not been known, communications with each vehicle can be performed with the ID-exchange timing being shifted, which prevents mutual interference caused by simultaneous responses sent from many vehicles.

After the first-order-network restriction has been decided as described above, when a vehicle included in the first-order network is provided with a relay function for relaying signals sent from vehicles included in a second-order network, the first-order network can be connected to the second-order network. In the same way, the first-order network can be connected to a third-order network, a fourth-order network, etc., to form a very-wide-area network. The network-forming-restriction decision processing shown in step S6 of FIG. 2 is also applied to vehicles included in such a very-wide-area network to restrict the network and to finally decide an appropriate-area network.

Figure 6:
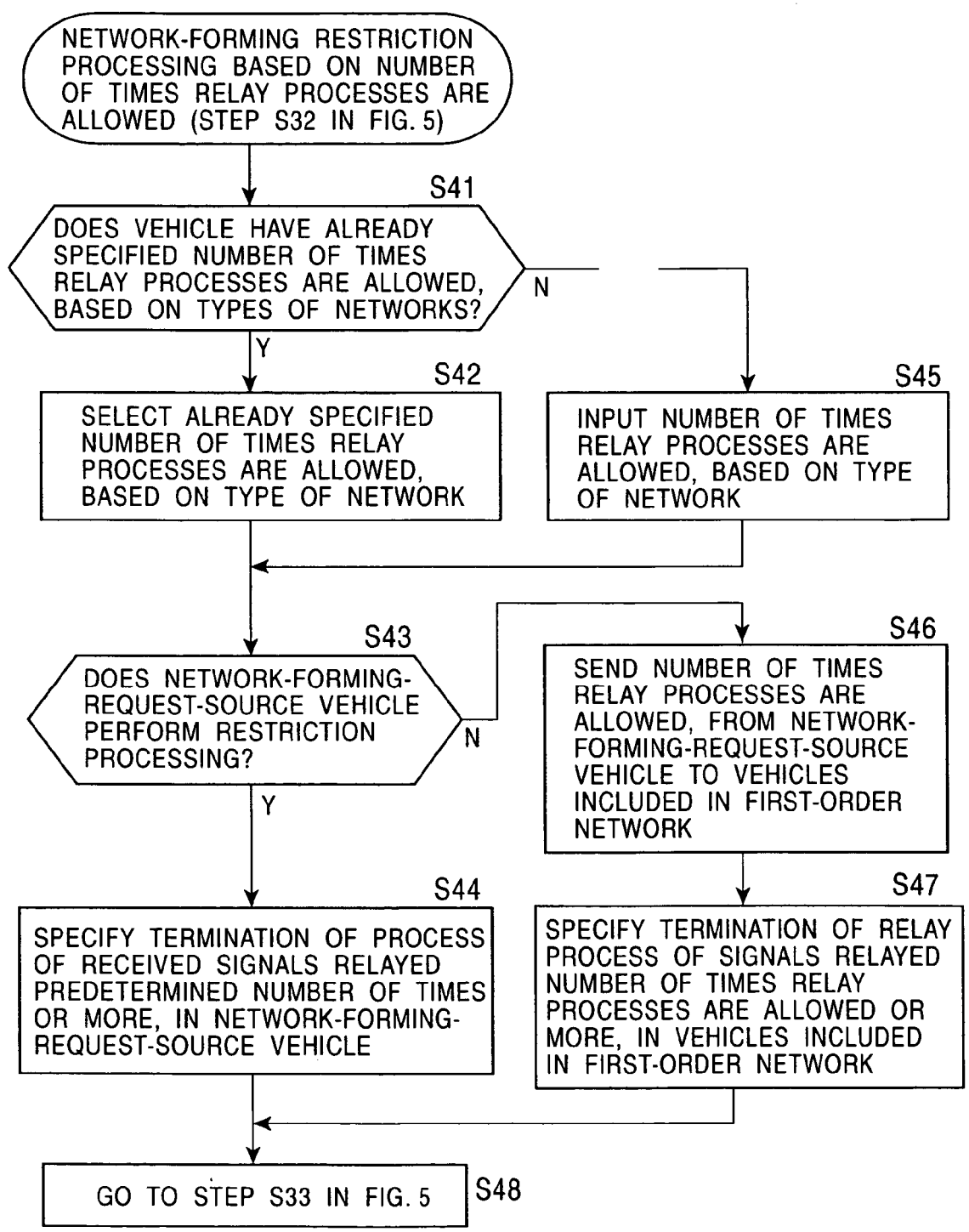
FIG. 6 is a flowchart of network-forming restriction processing based on the number of times relay processes are allowed, performed in step S32 of FIG. 5.
Figure 7:
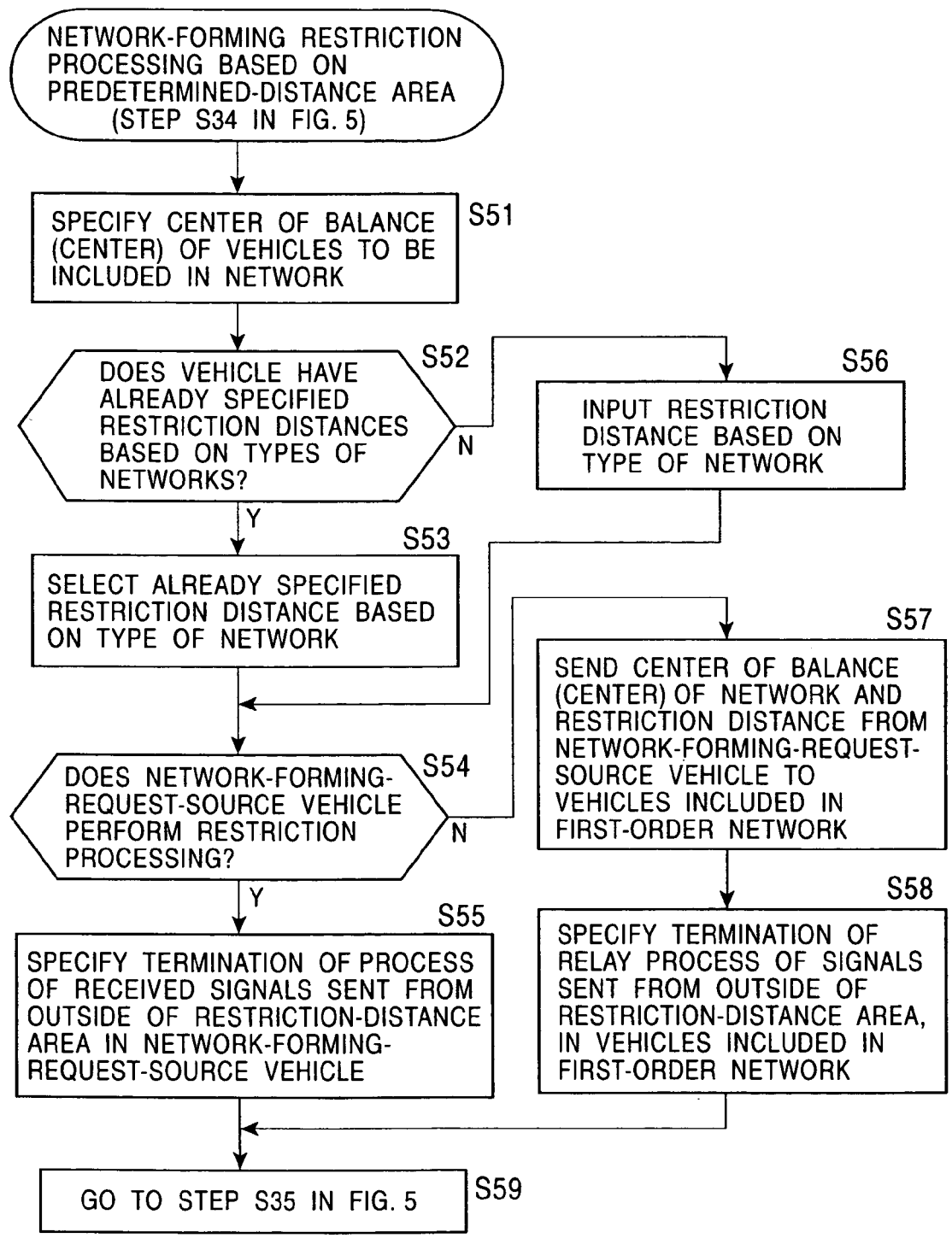
FIG. 7 is a flowchart of network-forming restriction processing based on a predetermined-distance area, performed in step S34 of FIG. 5.
Figure 8:
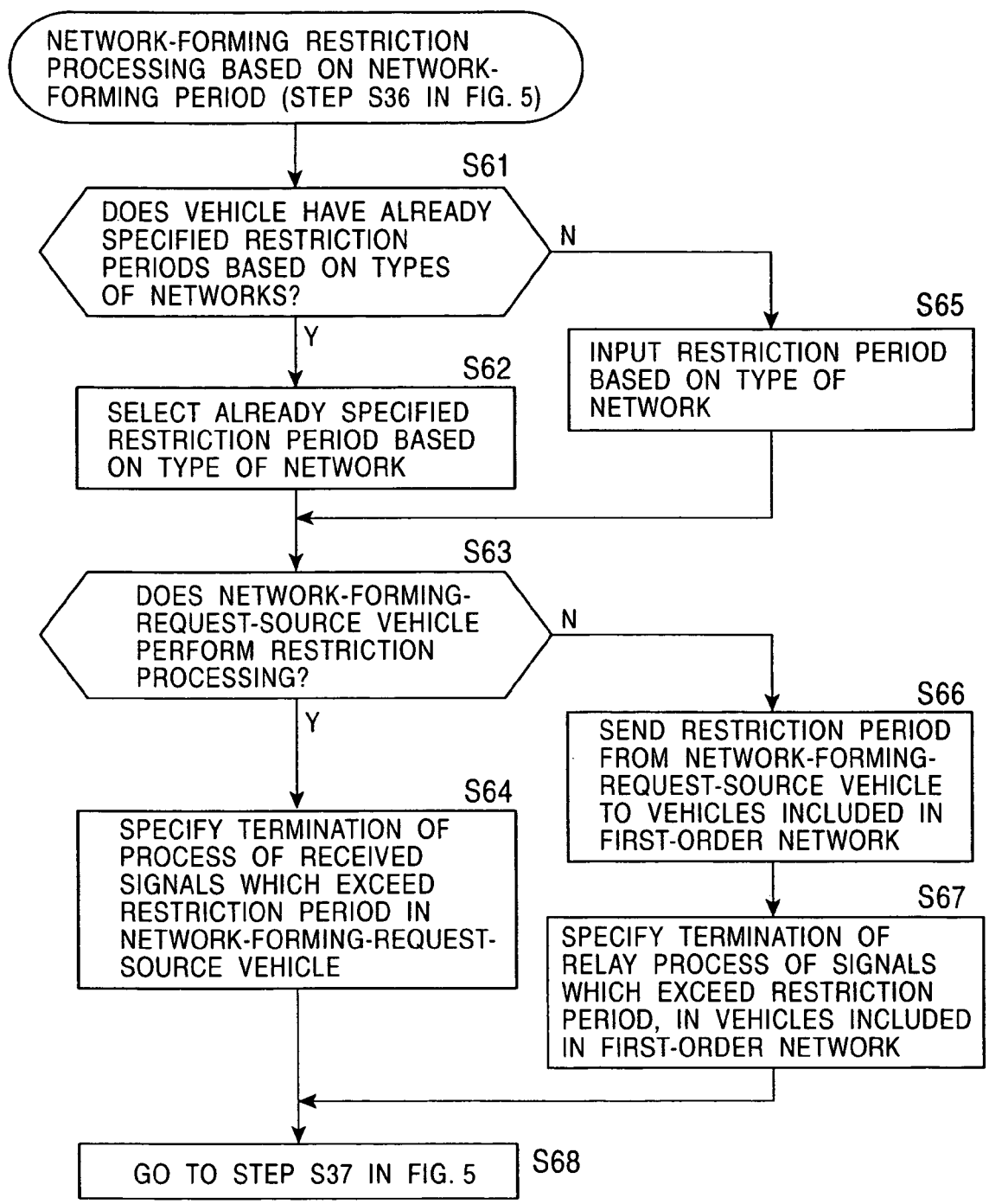
FIG. 8 is a flowchart of network-forming restriction processing based on a network-forming time period, performed in step S36 of FIG. 5.

The process of step S6 of FIG. 2 can be sequentially operated according to an operation flow shown in FIG. 5. FIG. 5 shows a case in which three types of network-forming-restriction processing are sequentially achieved. The order of these types of processing can be specified in a desired manner. Each type of processing is shown in FIG. 6 to FIG. 8. As shown in FIG. 5, in the network-restriction-decision processing in step S6 of FIG. 2, it is determined first in step S31 whether network-forming-restriction processing is performed according to the number of times relay processes are allowed. When it is determined that network-forming-restriction processing is performed according to the number of times relay processes are allowed in order to prevent a too-wide extension of the network caused by a large number of relay processes because information sent to the vehicles included in the network needs to pass through many local networks, the processing proceeds to step S32, and network-forming-restriction processing is performed according to the number of times relay processes are allowed, as described in detail in FIG. 6.

When it is determined in step S31 that it is not necessary to perform network-forming-restriction processing according to the number of times relay processes are allowed, or when it is necessary to perform the restriction processing and the restriction processing has been achieved, the network-forming-restriction-decision processing proceeds to step S33, and it is determined whether network-forming-restriction processing is performed according to a predetermined-distance area. When it is determined that information should be exchanged only with vehicles positioned in a predetermined-distance area from a specific point such as the center of balance or the center of the network or a specific intersection, in order to prevent the input of not-useful information relative to desired information, caused by the vehicles included in the network being positioned too far away, the network-forming-restriction-decision processing proceeds to step S34, and network-forming-restriction processing is performed according to a predetermined-distance area, as described in detail in FIG. 7.

When it is determined in step S33 not to perform network-forming-restriction processing according to a predetermined-distance area, or when it is necessary to perform the restriction processing and the restriction processing has been achieved, the network-forming-restriction-decision processing proceeds to step S35, and it is determined whether network-forming-restriction processing is performed according to a network-forming time period. When information is required by a specific time, such as a case in which the vehicle wants to obtain information about an event to be held at ten o'clock that day, by around eight o'clock, the network-forming-restriction-decision processing proceeds to step S36, and network-forming-restriction processing is performed according to a network-forming time period, as described in detail in FIG. 8.

When it is determined in step S35 not to perform network-forming-restriction processing according to a network-forming time period, or when the restriction processing has been achieved in step S36, the network-forming-restriction-decision processing proceeds to step S37, and the network is finally decided in step S7 of FIG. 2.

As shown in FIG. 6, in the network-forming-restriction processing based on the number of times relay processes are allowed, performed in step S32 of FIG. 5, it is first determined in step S41 whether the vehicle has recorded in its memory, or other memory, previously specified numbers of times to restrict relay processes. When it is determined that the vehicle has recorded already specified number of times values, the vehicle selects in step S42 the already specified number of times corresponding to the type of information required in the network. For example, the number of times relay processes are allowed is set to 30 in a network which requires detour information, the number of times relay processes are allowed is set to 50 in a network which requires the traffic-jam information for an ordinary road, and the number of times relay processes are allowed is set to 100 in a network which exchanges sightseeing-guide information.

When it is determined in step S41 that the vehicle has not recorded previously specified number of times values to restrict the number of times relay processes are allowed, the user enters the number of times relay processes are allowed according to the type of network in step S45. After the user specifies the number of times relay processes are allowed in this way, or it is automatically specified, it is determined in step S43 in the case shown in FIG. 6 whether the network-forming-request-source vehicle uses this restriction processing. This determination can be made by entering a selection into the inter-vehicle communication unit in advance, and by reading the input.

When it is determined in step S43 that the network-forming-request-source vehicle performs the restriction processing, the network-forming-request-source vehicle specifies the termination of the process of receiving signals relayed the predetermined number of times or more, in step S44. The termination is recorded in the relay-count-restriction processing section 63 of the network-forming-restriction-decision processing section 6 in the inter-vehicle communication apparatus 1 shown in FIG. 1. When the termination is recorded, and the network is decided, the termination data can be read in subsequent information-exchange processing to determine whether information is sent from a vehicle positioned in a restricted area.

When it is determined in step S43 that the network-forming-request-source vehicle does not perform the restriction processing, the network-forming-request-source vehicle sends the already specified number of times relay processes are allowed, selected in step S42 or the number of times relay processes are allowed entered by the user in step S45, to the vehicles included in the first-order network in step S46. When the number of times relay processes are allowed is included in network-forming data, the vehicles included in the first-order network can read it to perform subsequent processing. Each of the vehicles included in the first-order network specifies the termination of a relay process of signals relayed the number of times relay processes are allowed or more, in step S47. The termination is recorded in the relay-count-restriction processing section 86 of the relay-control processing section 8 shown in FIG. 1. When the termination is specified in the vehicles which perform relay processes and the network is decided, this termination data can be read in subsequent relay processes to determine whether a signal is sent from a vehicle which is allowed to perform a relay process. After the termination is specified, the network-forming restriction processing goes to step S33 of FIG. 5, in step S48.

As a result of the termination specified in step S44, superfluous information sent through relay processes which were performed more than the specified number of times relay processes are allowed is excluded in subsequent information-exchange communications. As a result of the termination specified in step S47, superfluous information is excluded in subsequent information-exchange communications since each of the vehicles included in the first-order network checks a signal to which another vehicle asks to apply a relay process, and does not perform a relay process if the signal is to be sent to the network-forming-request-source vehicle through relay processes which are performed more than the specified number of times relay processes are allowed.

Figure 11:
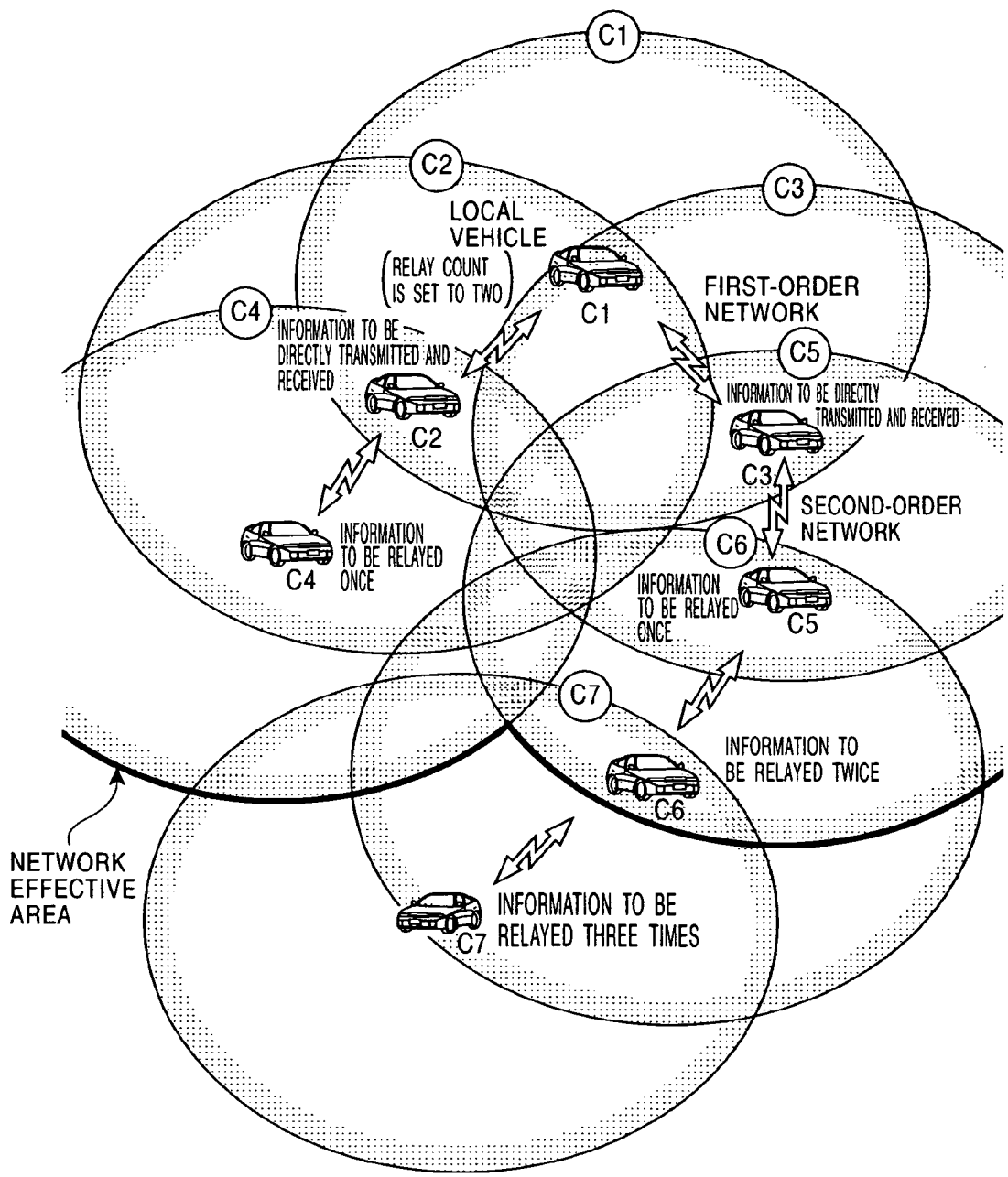
FIG. 11 illustrates an example network-forming restriction based on the number of times relay processes are allowed.

The restriction result obtained by such network-forming-restriction processing according to the number of times relay processes are allowed can, for example, be shown by reference to FIG. 11. The local vehicle C1 forms a first-order network (C1) in which the local vehicle C1 can perform direct communications, and vehicles C2 and C3 included in the first-order network also form networks C2 and C3 in which the vehicles C2 and C3 can perform direction communications, respectively. Therefore, the information of the vehicles C2 and C3 can be directly received by the local vehicle without a relay process. Since a vehicle C4 is positioned in the network (C2) of the vehicle C2 as the local vehicle C1 is, the information of the vehicle C4 can be sent to the local vehicle C1 by the relay process of the vehicle C2, and hence the information of the vehicle C4 is relayed-once information.

In the same way, since a vehicle C5 is positioned in the network (C3) of the vehicle C3 as the local vehicle C1 is, the information of the vehicle C5 can be sent to the local vehicle C1 by the relay process of the vehicle C5, and hence the information of the vehicle C5 is relayed-once information. In the same way, the information of a vehicle C6 can be sent to the local vehicle C1 by the relay processes of the vehicles C5 and C3, and hence the information of the vehicle C6 is relayed-twice information. The information of a vehicle C7 is relayed-three-times information.

When the local vehicle sets the number of times relay processes are allowed to two, for example, the information of the vehicle C7 can be restricted by the process of the local vehicle or the process of the vehicle C3 included in the first-order network (C1). In the restriction process of the local vehicle according to the number of times relay processes are allowed, receiving is disabled because the vehicle C7 is not included in the wide network, or the information of the vehicle C7 is received by the local vehicle but not processed. A vehicle relaying the information, other than the vehicles included in the first-order network can perform the restriction process. In addition, a vehicle which attempts to send information can read restriction data included in the network-forming data, obtain the required number of times relay processes are used until information reaches the network-forming-request-source vehicle, and stop transmission when the required number of times is equal to or larger than a predetermined number.

When a network-forming restriction such as that described above is applied according to the number of times relay processes are allowed, the optimum network area can be specified by restricting the number of times relay processes are allowed to an appropriate value, according to the type of a network, such as to 30 in a detour network, to 50 in an ordinary-road traffic-jam network, and to 100 in a sightseeing-guide network. This prevents traffic-jam information in Osaka from being sent to Tokyo. Depending on the type of network, the restriction can be removed, if necessary. Even when a group constituting a network is moved or changed, if a component of the network exists, the network is maintained. When a network cannot be maintained, it can be made extinct.

Figure 12:
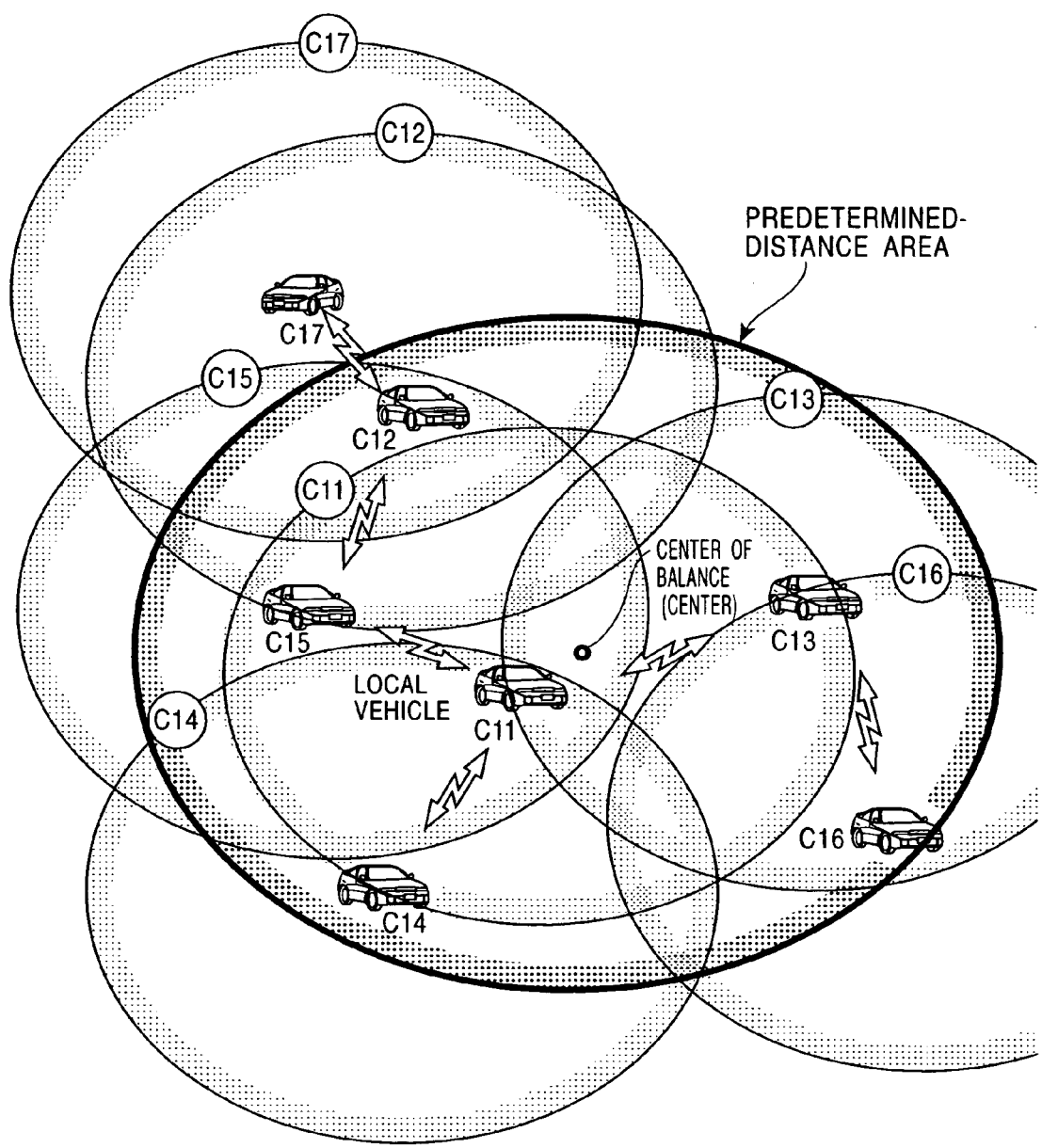
FIG. 12 illustrates an example network-forming restriction based on a predetermined-distance area.

Referring to FIG. 12, in the network-forming-restriction processing performed according to a predetermined-distance area in step S34 of FIG. 5, when a network for the local vehicle C11 is formed, if vehicles C13, C14, and C15 are positioned in the first-order network (C11) of the local vehicle C11, the vehicle C13 and a vehicle C16 form a network and therefore, the information of the vehicle C16 can be sent to the local vehicle C11 through the relay process of the vehicle C13, the information of a vehicle C12 can be sent to the local vehicle C11 through the relay process of the vehicle C15 in the same way, and the information of a vehicle C17 can be sent to the local vehicle C11 through the relay processes of the vehicles C12 and C15. For example, the center of balance of the network for the local vehicle C11 is obtained with the positions and density of vehicles included in the network being taken into account, or a point close to the local vehicle is set to the center of the network, and the area a predetermined distance from the center of balance of the network or the center of the network is set to an effective area serving as the predetermined-distance area.

In such restriction processing, as shown in FIG. 7, the center of balance or the center of the vehicles to be included in the network is specified first in step S51. A tentative network-forming area larger than the area expected in advance is first specified around the local vehicle, and the center of balance can be obtained from the vehicle distribution in the tentative network-forming area. The center of the network is basically set to the local vehicle, but it can be set to any point such as a point a predetermined distance ahead of the local vehicle in its moving direction.

Then, it is determined in step S52 whether the local vehicle has previously specified restriction distances based on the types of networks by recording them in a memory or by other methods. When it is determined that the local vehicle has the already specified restriction distances, the local vehicle selects in step S53 the already specified restriction distance based on the type of the network. When it is determined in step S52 that the local vehicle does not have already specified restriction distances based on the types of networks, the user enters a restriction distance based on the type of the network in step S56. The set restriction distance can indicate the radius of a circle. Alternatively, it can indicate the shorter radius or the longer radius of a predetermined-shape ellipse in which the radius is increased from the shorter radius to the longer radius at a predetermined rate. In this case, the restriction distance can be set correspondingly to the moving direction of the local vehicle.

Such a restriction distance can be specified according to the type of network. Alternatively, it can be specified such that, in a tentative network-forming area larger than the area expected in advance, used to calculate the center of balance, the number of vehicles included in the area specified by a distance from the center of balance or the center of the network is obtained, and the distance corresponding to the area in which the obtained number of vehicles is appropriate is set to the restriction distance. Specifying the number of vehicles substantially has the same meaning as specifying the density of vehicles in the network. Selecting both or either of the restriction distance based on the number of vehicles or the density of vehicles and the restriction distance based on the type of a network in order to form the network can be specified in a desired manner.

Methods other than those described above for obtaining the center of balance of a network or specifying the center of the network can be used. When a network for driving safely at a specific intersection is formed by vehicles positioned around the intersection, for example, the intersection can be set to the center of the network, and the size of the network can be specified by a distance from the intersection. When a network related to the road on which the local vehicle is currently moving is formed, the network-forming area can be specified by a predetermined distance from the local vehicle in its moving direction, a predetermined distance from the local vehicle in the direction opposite the moving direction, and a predetermined distance from the road in the direction perpendicular to the road.

After the user specifies the restriction distance in this way or it is automatically specified, it is determined in step S54 in the case shown in FIG. 7 whether the network-forming-request-source vehicle uses this restriction processing, in the same way as in step S43 of FIG. 6. This determination can also be made by entering a selection into the inter-vehicle communication unit in advance, and by reading the input.

When it is determined in step S54 that the network-forming-request-source vehicle performs the restriction processing, the network-forming-request-source vehicle specifies the termination of the process of receiving signals sent from outside the restriction-distance area in step S55. The termination is recorded in the network-forming-distance-area-restriction processing section 64 of the network-forming-restriction-decision processing section 6 in the inter-vehicle communication apparatus 1 shown in FIG. 1.

When it is determined in step S54 that the network-forming-request-source vehicle does not perform the restriction processing, the network-forming-request-source vehicle sends the already specified restriction distance selected in step S53 or the restriction distance entered by the user in step S56 to the vehicles included in the first-order network in step S57. When the center of balance or the center position, and the restriction distance are included in network-forming data, the vehicles included in the first-order network can read them to perform subsequent processing. Each of the vehicles included in the first-order network specifies the termination of a relay process of signals sent from vehicles positioned outside the restriction distance area, in step S58. The termination is recorded in the network-forming-distance-area-restriction processing section 87 of the relay-control processing section 8 shown in FIG. 1. After the termination is specified, the network-forming restriction processing goes to step S35 of FIG. 5, in step S59.

As a result of the termination specified in step S55, superfluous information sent from vehicles positioned outside the specified restriction distance is excluded in subsequent information-exchange communications. As a result of the termination specified in step S58, superfluous information is excluded in subsequent information-exchange communications since each of the vehicles included in the first-order network checks a signal to which another vehicle asks to apply a relay process, and does not perform a relay process if the signal was sent from a vehicle outside the restriction distance. With such network-forming restriction processing based on a restriction distance, vehicles positioned within a predetermined-distance area from the center of balance or the center can be included in a network as shown in FIG. 12.

The restriction process based on a restriction distance is performed when the local vehicle does not receive information sent from vehicles positioned outside the area of the vehicles included in the network. In addition, the restriction process is performed when the local vehicle receives signals but does not process a signal received from vehicles positioned outside the area of the vehicles included in the network. A vehicle relaying the information, other than the vehicles included in the first-order network can perform the restriction process. In addition, in the same way as in the case of FIG. 6, when a vehicle which attempts to send information has come to know according to the restriction distance included in the network-forming information that the vehicle is positioned outside the network area, the vehicle can stop transmission.

When a network-forming restriction such as that described above is applied according to a restriction distance, the optimum network area can be specified by restricting the network to have an appropriate size according to the type of network, or by restricting the network to have an appropriate size according to the number of vehicles or the vehicle density in the network, such as by restricting a detour network to have a radius of 1 km, an ordinary-road traffic-jam network to have a radius of 3 km, and a sight-seeing-guide network to have a radius of 20 km. Even when a group constituting a network is moved or changed, if a component of the network exists, the network is maintained. When a network cannot be maintained, it can be made extinct.

Figure 13:
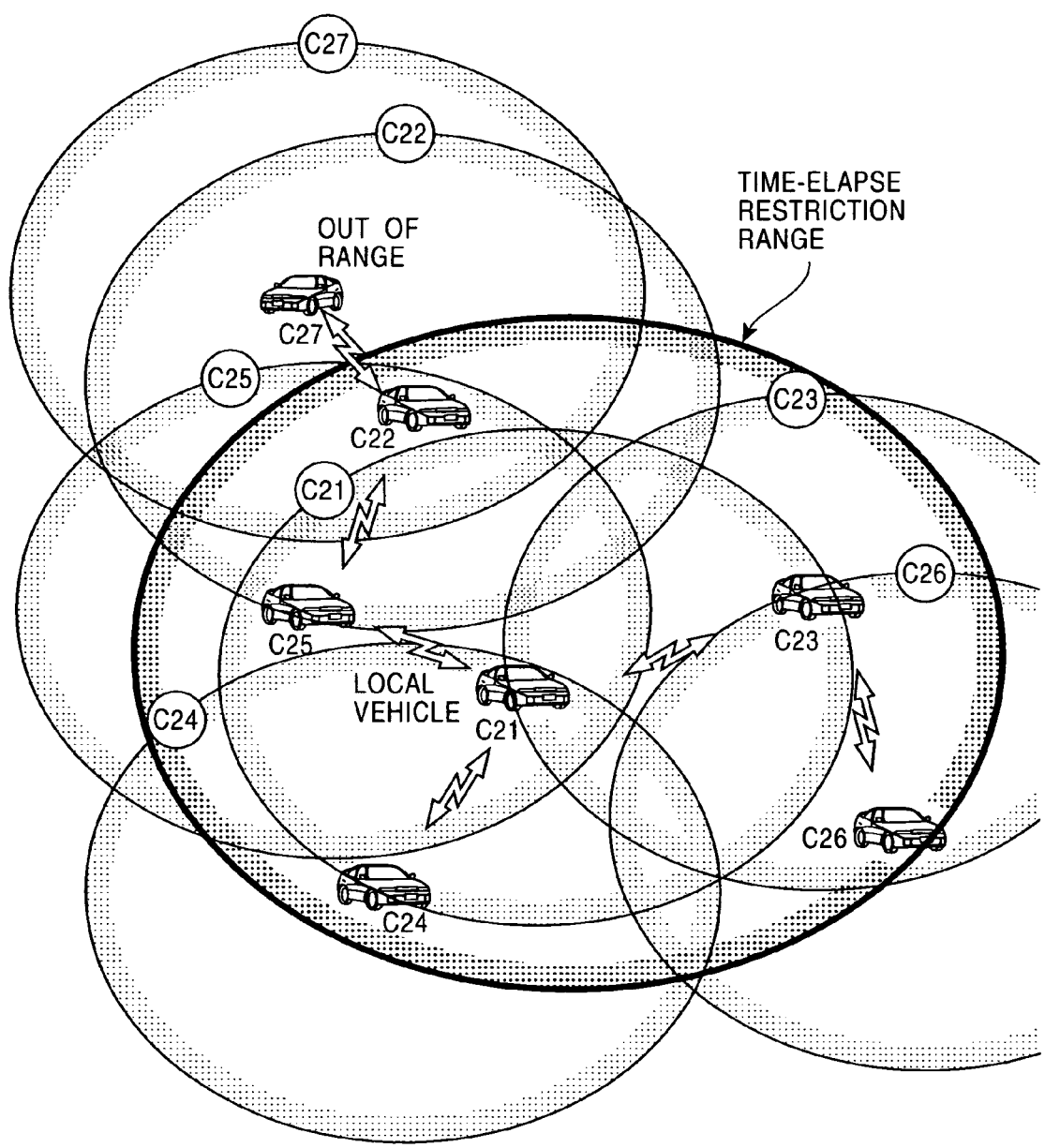
FIG. 13 illustrates an example network-forming restriction based on a network-forming time period.
Figure 14:
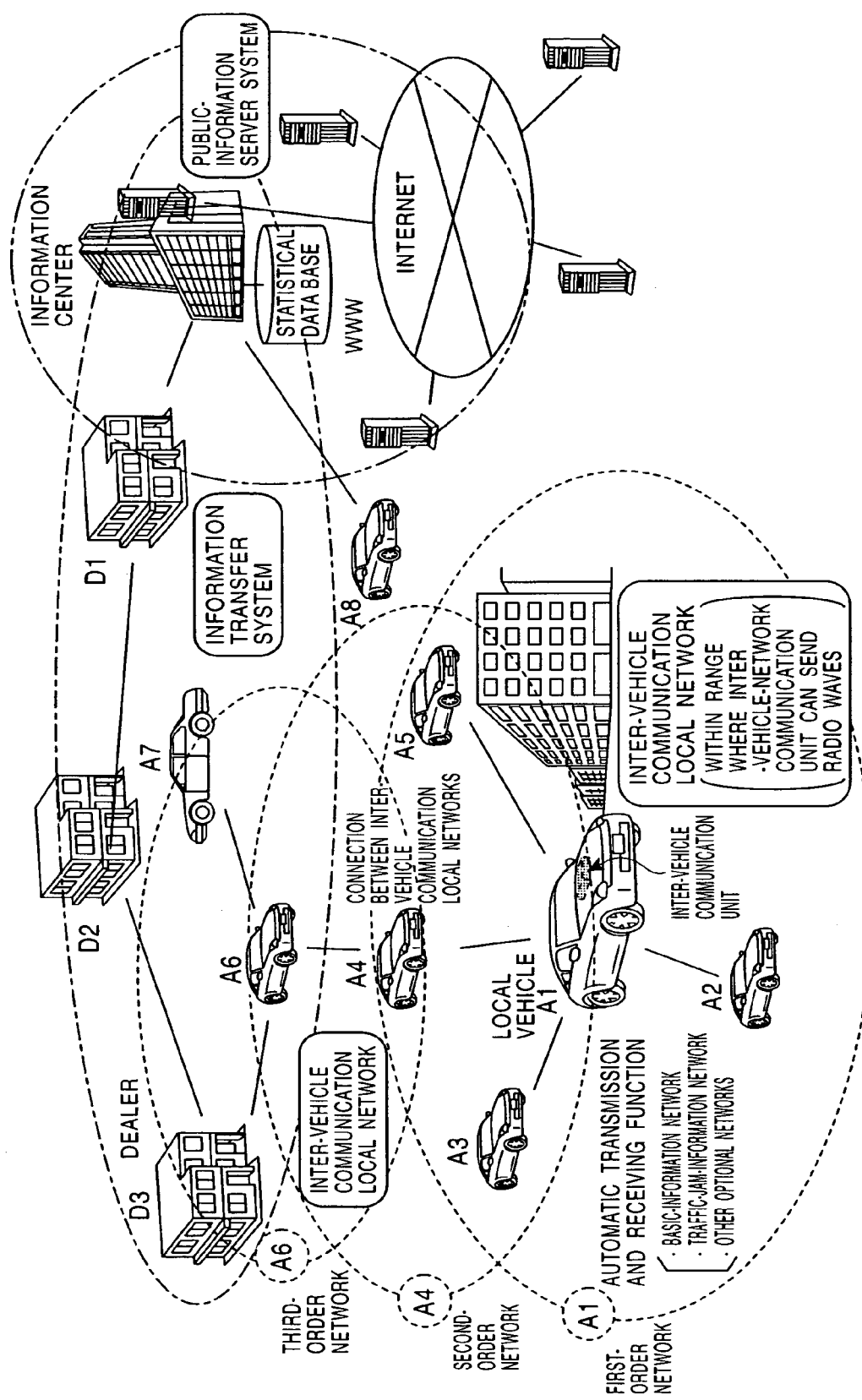
FIG. 14 illustrates aspects of forming inter-vehicle networks.
Figure 15:
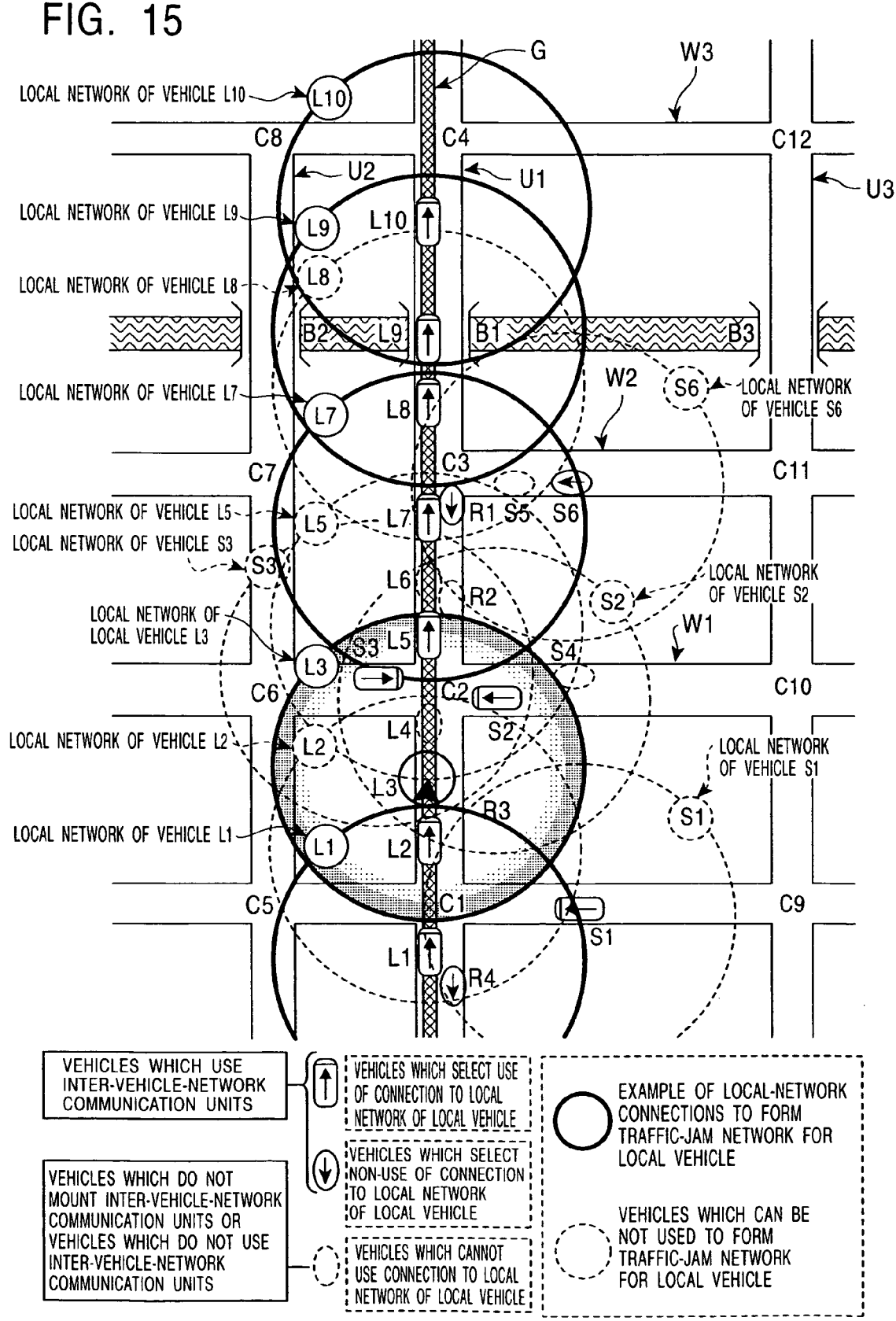
FIG. 15 illustrates a driving-path network formed of inter-vehicle networks.

As shown in FIG. 13, in the network-forming-restriction processing performed according to a network-forming time period in step S36 of FIG. 5, when a network for the local vehicle C21 is formed, if vehicles C23, C24, and C25 are positioned in the first-order network (C21) of the local vehicle C21, the vehicle C23 and a vehicle C26 form a network and therefore, the information of the vehicle C26 can be sent to the local vehicle C21 through the relay process of the vehicle C23, the information of a vehicle C22 can be sent to the local vehicle C21 through the relay process of the vehicle C25 in the same way, and the information of a vehicle C27 can be sent to the local vehicle C21 through the relay processes of the vehicles C22 and C25, for example. A restriction time such as two hours can be specified in advance from when information is requested at network forming to generate a time-elapse restriction range. When a predetermined time has elapsed, information exchanges are disabled in the network.

In such restriction processing, as shown in FIG. 8, it is determined in step S61 whether the local vehicle has previously specified restriction periods based on the types of networks by recording them in a memory or by other methods. When it is determined that the local vehicle has the already specified restriction periods, the local vehicle selects in step S62 the already specified restriction period based on the type of network. When it is determined in step S61 that the local vehicle does not have already specified restriction periods based on the types of networks, the user enters a restriction period based on the type of the network in step S65.

After the user specifies the restriction period in this way or it is automatically specified, it is determined in step S63 in the case shown in FIG. 8 whether the network-forming-request-source vehicle uses this restriction processing, in the same way as in step S43 of FIG. 6 or in step S54 of FIG. 7. This determination can also be made by entering a selection into the inter-vehicle communication unit in advance, and by reading the input.

When it is determined in step S63 that the network-forming-request-source vehicle performs the restriction processing, the network-forming-request-source vehicle specifies the termination of the process of receiving signals which have exceeded the restriction period in step S64. The termination is recorded in the communication-time-restriction processing section 65 of the network-forming-restriction-decision processing section 6 in the inter-vehicle communication apparatus 1 shown in FIG. 1.

When it is determined in step S63 that the network-forming-request-source vehicle does not perform the restriction processing, the network-forming-request-source vehicle sends the already specified restriction period selected in step S62 or the restriction period entered by the user in step S65 to the vehicles included in the first-order network in step S66. When the restriction-period data is included in advance in network-forming data, the vehicles included in the first-order network can read it to perform subsequent processing. Each of the vehicles included in the first-order network specifies the termination of a relay process of signals which have exceeded the restriction period, in step S67. The termination is recorded in the communication-time-restriction processing section 88 of the relay-control processing section 8 shown in FIG. 1. After the termination is specified, the network-forming restriction processing goes to step S37 of FIG. 5, that is, step S7 of FIG. 2, in step S68.

As a result of the termination specified in step S64, superfluous information sent with the specified restriction period being exceeded is excluded in subsequent information-exchange communications. As a result of the termination specified in step S67, superfluous information is excluded in subsequent information-exchange communications since each of the vehicles included in the first-order network checks a signal to which another vehicle asks to apply a relay process, and does not perform a relay process if the signal reached with the restriction period being exceeded. With such network-forming restriction processing based on a restriction period, vehicles positioned in a time-elapse-restriction range can be included in a network as shown in FIG. 13.

The restriction process based on a restriction time period is performed when the local vehicle does not receive information sent with a predetermined period being exceeded. In addition, the restriction process is performed when the local vehicle receives signals but does not process a signal received with a predetermined time period being exceeded. A vehicle relaying the information, other than the vehicles included in the first-order network, can perform the restriction process. In addition, when a vehicle which attempts to send information has come to know according to the restriction period included in the network-forming information that the information to be sent exceeded the restriction period, the vehicle can stop transmission. Further, the information search section of the apparatus can be set such that it does not perform searching for requested information which exceeds the restriction period.

When a network-forming restriction such as that described above is applied according to a restriction time period, the optimum network area can be specified by restricting the network-forming period to an appropriate period according to the type of network, such as to 30 minutes in an ordinary-road traffic-jam network, to half a day in a today's event information network, and to 10 minutes in an emergency-vehicle information network. Even when a group constituting a network is moved or changed, if a component of the network exists, the network is maintained. When a network cannot be maintained, or when the restriction period has elapsed and the usefulness of the information has run out, it can be made extinct.

What is claimed is:

1. An inter-vehicle communication apparatus located in each of a plurality of vehicles, the apparatus comprising:

an inter-vehicle communication unit for transmitting and receiving information between vehicles;
a network-forming processing section for forming a network with at least some of said plurality of vehicles; and
an information-exchange processing section for performing information-exchange processing between vehicles in a formed network,
wherein the network-forming processing section comprises a network-forming restriction section for restricting a network-forming area, and the network-forming restriction section comprises a relay section for receiving a signal from another vehicle and for sending it to yet another vehicle.

2. An inter-vehicle communication apparatus according to claim 1, wherein the network-forming restriction section is a first-order-network restriction section for restricting the forming of a first-order network in which the inter-vehicle communication unit directly performs communications.

3. An inter-vehicle communication apparatus according to claim 1, wherein the network-forming restriction section restricts the number of times relay processes are performed by relay sections between when a vehicle sends information and when the network-forming-request-source vehicle receives the information.

4. An inter-vehicle communication apparatus according to claim 1, wherein the network-forming restriction section restricts the network-forming area by making, in a relaying vehicle which receives a restriction signal from an information-requesting vehicle, the relay section not relay a signal.

5. An inter-vehicle communication apparatus according to claim 1, wherein the network-forming restriction section restricts the network-forming area according to the time period which has elapsed from when information was requested.

6. An inter-vehicle communication apparatus according to claim 1, wherein the network-forming restriction section restricts the network-forming area according to the type of information to be exchanged between network-forming vehicles.

7. An inter-vehicle communication apparatus according to claim 1, wherein The network-forming restriction section comprises a storage section for storing in advance at least one restriction value.

8. An inter-vehicle communication apparatus according to claim 1, wherein the network-forming restriction section restricts the network-forming area by making The inter-vehicle communication unit of the vehicle to which the inter-vehicle communication unit is mounted restrict processing for receiving information sent to the vehicle.

9. An inter-vehicle communication apparatus according to claim 1, wherein the network-forming restriction section restricts the network-forming area by making an information-transmitting vehicle which has received a restriction signal from an information-requesting vehicle not perform information-transmitting processing.

10. An inter-vehicle communication apparatus according to claim 1, wherein the network-forming restriction section updates vehicles positioned in a network-forming restriction area in response to vehicle movement or the passage of time.

11. An inter-vehicle communication apparatus according to claim 1, wherein the network-forming restriction section restricts the network-forming area according to a distance from a specific position.

12. An inter-vehicle communication apparatus according to claim 11, wherein the specific position is one of the center of balance or the center obtained from the network to be formed, or the position of the vehicle to which the inter-vehicle communication apparatus is mounted.

13. An inter-vehicle communication apparatus according to claim 11, wherein the distance from the specific position is set according to the number of vehicles included in the network to be formed.

14. An inter-vehicle communication apparatus according to claim 11, wherein the specific position is a specific intersection.

15. An inter-vehicle communication apparatus located in each of a plurality of vehicles, the apparatus comprising:
an inter-vehicle communication unit for transmitting and receiving information between vehicles;
a network-forming processing section for forming a network with at least some of said plurality of vehicles; and
an information-exchange processing section for performing information-exchange processing between vehicles in a formed network,
wherein the network-forming processing section comprises a network-forming restriction section for restricting a network-forming area, and the network-forming restriction section is a first-order-network restriction section for restricting the forming of a first-order network in which the inter-vehicle communication unit directly performs communications;
wherein the first-order-network restriction section sends at least a signal indicating the position of the vehicle to which the inter-vehicle communication apparatus is mounted, the position serving as a reference position, and a network-forming-request signal to surrounding vehicles by the use of a tentative PN code known to other vehicles, and surrounding vehicles which receive both of the signals sequentially communicate with a network-forming-request-source vehicle at a timing specified in advance according to the positions of the surrounding vehicles relative to the reference position.

16. An inter-vehicle communication apparatus according to claim 15, wherein the first-order-network restriction section counts the number of vehicles by signals sequentially sent from the surrounding vehicles to the network-forming-request-source vehicle and stops receiving when the number of vehicles is equal to or larger than a predetermined value to restrict the forming of the first-order network.

17. An inter-vehicle communication apparatus according to claim 15, wherein the surrounding vehicles sequentially communicate with the network-forming-request-source vehicle by the use of a free ID.

18. An inter-vehicle communication apparatus according to claim 17, wherein the surrounding vehicles exchange genuine-ID data with the network-forming-request-source vehicle after the forming of the first-order network is restricted.

19. An inter-vehicle communication system, comprising:
an inter-vehicle communication apparatus located in each of a plurality of vehicles, said apparatus comprising:
an inter-vehicle communication unit for transmitting and receiving information between vehicles; and
a network-forming processing section for forming a network among at least some of said plurality of vehicles and restricting the size of the network based on at least one of a predetermined number of vehicles permitted in the network, a predetermined number of times a relay process can be performed between a vehicle transmitting information and another vehicle receiving information in the network, a distance of a vehicle from a specific position, and a predetermined time which has elapsed.

20. A method of operating an inter-vehicle communication system, comprising:

providing an inter-vehicle communication apparatus located in each of a plurality of vehicles, said apparatus including an inter-vehicle communication unit for transmitting and receiving information between vehicles; and forming a network among at least some of said plurality of vehicles and restricting the size of the network based on at least one of a predetermined number of vehicles permitted in the network, a predetermined number of times a relay process can be performed between a vehicle transmitting information and another vehicle receiving information in the network, a distance of a vehicle from a specific position, and a predetermined time which has elapsed.

\* \* \* \* \*